United States Patent
Gonzaga et al.

(10) Patent No.: US 11,712,932 B2
(45) Date of Patent: Aug. 1, 2023

(54) APPARATUS AND PROCESS FOR THE ASSEMBLY AND DISASSEMBLY OF TIRES

(71) Applicant: Butler Engineering and Marketing S.p.A. (Butler, S.p.A.), Rolo (IT)

(72) Inventors: Tullio Gonzaga, Correggio (IT); Paolo Signorelli, Rio Saliceto (IT)

(73) Assignee: Butler Engineering and Marketing S.p.A. (BUTLER S.P.A.), Rolo (IT)

( * ) Notice: Subject to any disclaimer, the term of this patent is extended or adjusted under 35 U.S.C. 154(b) by 150 days.

(21) Appl. No.: 17/175,379

(22) Filed: Feb. 12, 2021

(65) Prior Publication Data
US 2021/0252925 A1    Aug. 19, 2021

(30) Foreign Application Priority Data
Feb. 13, 2020   (IT) .................. 102020000002920

(51) Int. Cl.
*B60C 25/138*   (2006.01)
*B60C 25/05*    (2006.01)
*B60C 25/14*    (2006.01)

(52) U.S. Cl.
CPC ........ *B60C 25/138* (2013.01); *B60C 25/0548* (2013.01); *B60C 25/145* (2013.01); *B60C 25/147* (2013.01)

(58) Field of Classification Search
CPC ... B60C 25/138; B60C 25/145; B60C 25/147; B60C 25/0548
See application file for complete search history.

(56) References Cited

U.S. PATENT DOCUMENTS

| | | | |
|---|---|---|---|
| 7,048,026 B2 * | 5/2006 | Bonacini | B60C 25/0518 157/1.28 |
| 9,073,394 B1 | 7/2015 | Clasquin et al. | |

FOREIGN PATENT DOCUMENTS

| | | |
|---|---|---|
| CN | 110126558 A | 8/2019 |
| EP | 1040941 A2 | 10/2000 |
| EP | 1157860 A2 | 11/2001 |
| EP | 1916125 A1 | 4/2008 |
| JP | 2010234984 A | 10/2010 |

(Continued)

OTHER PUBLICATIONS

Thanbichler, Italian Search Report for Italian patent application No. IT202000002920, dated Sep. 17, 2020, 8 pages.

(Continued)

*Primary Examiner* — David B. Thomas
(74) *Attorney, Agent, or Firm* — Fish & Richardson P.C.

(57) ABSTRACT

A tire changer apparatus for the assembly or disassembly of tires from a rim of a wheel of a vehicle, said tire changer apparatus comprising: a base; a drive unit movable along a predetermined direction and configured to rotate, around a rotation axis, a wheel of a vehicle; a frame emerging from the base. The rotation axis of the wheel and the predetermined direction define an ideal plane of movement of the drive unit. The apparatus also comprises a first and a second device, each of which comprises: an arm hinged to the frame and configured to rotate around a respective axis parallel to the rotation axis of the wheel, a tool configured to operate on a rim and/or a tire of a wheel; the first and second devices are configured to arrange the respective tools on opposite sides with respect to said ideal plane.

19 Claims, 10 Drawing Sheets

(56) References Cited

FOREIGN PATENT DOCUMENTS

| WO | WO2014020395 A1 | 2/2014 |
| WO | WO2014129476 A1 | 8/2014 |

OTHER PUBLICATIONS

Thanbichler, Italian Search Report for Italian Patent Appln. No. IT102021000005828, dated Nov. 3, 2021, 23 pages.
[No Author Listed] [online], "John Bean ATC 1000," Feb. 5, 2016, retrieved on Mar. 6, 2023, retrieved from URL <https://www.youtube.comlwatch?v=GOAp7oXBU4>, 2 pages [Video Submission].
[No Author Listed] [online], "Quadriga 1000," Jan. 17, 2020, retrieved on Mar. 6, 2023, retrieved from URL <https://www.youtube.com/watch?v=u3eMAM515mQ>, 2 pages [Video Submission].
Intention to Grant a European Patent in European Appln. No. 21154807.8, dated Feb. 16, 2023, 43 pages.
Office Action in European Appln. No. 21154807.8, dated Jul. 4, 2022, 3 pages.
Third Party Observations in European Appln. No. 21154807.8, dated Jan. 21, 2022, 21 pages.
Third Party Observations in European Appln. No. 21154807.8, dated Jan. 3, 2023, 20 pges.

\* cited by examiner

APPARATUS AND PROCESS FOR THE ASSEMBLY AND DISASSEMBLY OF TIRES

CLAIM OF PRIORITY

This application claims priority under 35 USC § 119(a) to Italian Patent Application No. 102020000002920, filed on Feb. 13, 2020, the entire contents of which is hereby incorporated by reference.

TECHNICAL FIELD

The present invention relates to a tire changer apparatus, a process for the disassembly from vehicle wheels and a process for the assembly of tires on vehicle wheels. The present invention can be applied in the field of construction of equipment for the assistance and repair of transport means. The present invention can also be applied in the automobile field for replacing car tires or for the first assembly of a tire on a rim of a car. The present invention can nevertheless be generally employed in all fields that require the assembly and/or the disassembly of tires from rims for many different types of vehicles, including trucks, vans, farming vehicles or motorcycles.

BACKGROUND

Tire changer apparatuses are employed today, which allow executing the first assembly or the replacement of tires from rims of vehicles. Tire changer apparatuses may include a base carrying a drive unit configured to support the wheel and to allow the rotation around an axis; such known apparatuses have a frame emerging from the base and carrying an upper pressing tool and a lower pressing tool, both configured for pressing the bead of the tire so as to allow, in step of disassembly, the unsticking of the bead from the rim and, in step of assembly, the insertion of the bead between the edges of the rim. Among the tools used by the known tire changer apparatuses, an inserter-extractor tool is also known, it too carried by the frame, configured to be radially interposed between the bead of the tire and the edge of the rim in order to allow the lifting of the bead and the partial engagement or disengagement of the latter with the edge of the rim. Due to the interaction of the tools with the tire and the simultaneous rotation of the wheel on the drive unit, the tire changer apparatuses allow inserting the tire on the rim of a wheel.

A drawback of some tire changing apparatuses is tied to the extensibility of the arms carrying the tools, which renders the structure extremely complex and often delicate. Both during the step of assembly and that of disassembly of the tire, the tools are subjected to high stresses generated by the necessary pressures to be applied on the tire. The extensible structure of the arms can have a section with low structural strength, which are often subjected to damage and which can consequently involve costly operations of maintenance/repair of the apparatus. Also, the presence of arms with tilt fixed with respect to the frame and to the base can prevent the tools from working correctly with the variation of the size of the wheel.

In other known systems, the structure of the arms can prevent the tools from maintaining, upon varying the dimensions of the wheel, a correct tilt with respect to the tire and a correct distance between the same tools; this limitation prevents the apparatus from working in a correct manner with a wide range of tires with different diameter and width, a condition which renders such apparatus poorly flexible in use.

SUMMARY

In one aspect, a tire changer apparatus (1) is provided for the assembly and/or disassembly of tires (P) from a rim of a wheel (R) of a vehicle, said tire changer apparatus (1) comprising:
  a base (2),
  a drive unit (3) coupled to the base (2) and configured to receive and rotate around a rotation axis (Z) at least one wheel (R) of a vehicle;
  a frame (4) emerging from the base (2), wherein the drive unit (3) is movable with respect to the base (2), along a predetermined direction (X) transverse, optionally orthogonal, to the rotation axis (Z), close to and away from the frame (4),
  at least one first and a second device (5, 6) each of which comprises:
    at least one arm (7, 70) hinged to the frame (4) and configured to rotate around a respective axis (Y, Y') substantially parallel to the rotation axis (Z) of the wheel (R),
    at least one tool (8, 80) terminally carried by the arm (7, 70) and configured to operate on a rim and/or a tire of a wheel (R) carried by the drive unit (3).

In one aspect according to the preceding aspect the rotation axis (Z) of the wheel (R) and the predetermined direction (X) define an ideal plane (P) of movement of the drive unit (3). In one aspect according to the preceding aspect the first and second devices (5, 6) are configured to arrange the respective tools (8, 80) on opposite sides with respect to said ideal plane (P).

In one aspect according to any one of the preceding aspects the first and second devices (5, 6) are configured to arrange the rotation axes (Y, Y') of the respective arms (7, 70) on opposite sides with respect to said ideal plane (P).

In one aspect according to any one of the preceding aspects the rotation axis (Y) of the arm (7) of the first device (5) is arranged at a pre-established distance (D1) from the ideal plane (P) greater than 100 mm, optionally comprised between 150 and 250 mm. In one aspect according to any one of the preceding aspects the rotation axis (Y') of the arm (70) of the second device (6) is arranged at a pre-established distance (D2) from the ideal plane (P) greater than 100 mm, optionally comprised between 150 and 250 mm. In one aspect according to any one of the preceding aspects the distance between the rotation axis (Y) of the arm (70) of the first device (5) and the ideal plane (P) is substantially identical to the distance present between the rotation axis (Y') of the arm (70) of the second device (6) and the ideal plane (P).

In one aspect according to any one of the preceding aspects the tool (8) of the first device (5) is configured to be arranged at a distance (D3) from the ideal plane (P) greater than 40 mm, optionally comprised between 50 and 150 mm. In one aspect according to any one of the preceding aspects the tool (80) of the second device (6) is configured to be arranged at a distance (D4) from the ideal plane (P) greater than 40 mm, optionally comprised between 50 and 150 mm.

In one aspect according to any one of the preceding aspects the first and second devices (5, 6), at least during a work condition in which both the tools (8, 80) of said first and second devices (5, 6) are adapted to contact the tire, are configured to move the respective tools such that the distance present between the tool (8) of the first device (5) and the ideal plane (P) is substantially identical to the distance present between the tool (80) of the second device (6) and said ideal plane (P).

In one aspect according to any one of the preceding aspects the tool (8) of the first device (5) is arranged at a substantially fixed distance from the rotation axis (Y) of the arm (7) of the same first device (5). In one aspect according to any one of the preceding aspects the tool (80) of the second device (6) is arranged at a substantially fixed distance of the rotation axis (Y') of the arm (70) of the same second device (6).

In one aspect according to any one of the preceding aspects the rotation axis (Y) of the arm (7) of the first device (5) and a geometric center of the tool (8) of the same first device (5) define a virtual plane that is tilted with respect to the ideal plane (P) by an angle comprised between 10° and 45°, in particular comprised between 15° and 30°. In one aspect according to any one of the preceding aspects the rotation axis (Y') of the arm (70) of the second device (6) and a geometric center of the tool (80) of the same second device (6) define a virtual plane that is tilted with respect to the ideal plane (P) by an angle comprised between 10° and 45°, in particular comprised between 15° and 30°.

In one aspect according to any one of the preceding aspects the first and second devices (5, 6)—at least during a work condition in which both the tools (8, 80) of said first and second devices (5, 6) are adapted to contact the tire—are configured to move the respective tools (8, 80) such that the angles of the virtual planes, respectively of the first and of the second device (5, 6), are substantially identical in relation to the ideal plane (P).

In one aspect according to any one of the preceding aspects the first device (5) is movable with respect to the frame (4) along a direction substantially parallel to the rotation axis (Z) of the wheel (R).

In one aspect according to any one of the preceding aspects the frame (4) comprises at least one first guide (11) extended parallel to the rotation axis (Z) of the wheel (R). In one aspect according to any one of the preceding aspects the first device (5) comprises at least one engagement portion (5a) constrained to said first guide (11) and also configured to allow the translation of the first device (5) along said first guide (11).

In one aspect according to any one of the preceding aspects the first guide (11) comprises:

a shaft (11a) constrained to at least one first hinge (4a) of the frame (4) and extended along an axis coinciding with the rotation axis (Y) of the arm (7) of the first device (5), at least one track (11b), preferably flat, stably constrained to the shaft (11a) and extended parallel to the latter, wherein the track (11b) is configured to directly engage the engagement portion (5a) of the first device (5) and allow the latter to slide along a direction parallel to the rotation axis (Y) of the arm (7) of the first device (5), optionally parallel to the rotation axis (Z) of the wheel.

In one aspect according to any one of the preceding aspects the second device (6) is movable with respect to the frame (4) along a direction substantially parallel to the rotation axis (Z) of the wheel (R). In one aspect according to any one of the preceding aspects the frame (4) comprises at least one second guide (12) extended parallel to the rotation axis (Z) of the wheel (R). In one aspect according to any one of the preceding aspects the second device (6) comprises at least one engagement portion (6a) constrained to said second guide (12) and configured to allow the translation of the second device (6) along said second guide (12).

In one aspect according to any one of the preceding aspects the second guide (12) comprises:

a shaft (12a) constrained to at least one second hinge (4b) of the frame (4) and extended along an axis coinciding with the rotation axis (Y') of the arm (70) of the second device (6), at least one track (12b), preferably flat, stably constrained to the shaft (12a) of the second device (6) and extended parallel to the latter, said track (12b) being configured to directly engage the engagement portion (6a) of the second device (6) and allow the latter to slide along a direction parallel to the rotation axis (Y') of the arm (70) of the second device (6), optionally parallel to the rotation axis (Z) of the wheel.

In one aspect according to any one of the preceding aspects the first and the second guide (11, 12) of the frame (4) are symmetrically arranged with respect to the ideal plane (P).

In one aspect according to any one of the preceding aspects the first device (5) is movable via sliding along the first guide (11) independent of the relative movement via sliding of the second device (6) along said second guide (12).

In one aspect according to any one of the preceding aspects the tire changer apparatus (1) comprises at least one lifting actuator (21) active on at least one of said first and second devices (5, 6), said lifting actuator (21) being configured to allow the movement of at least one of said first and second devices (5, 6) with respect to the base (2) along a direction substantially parallel to the rotation axis (Z) of the wheel (R).

In one aspect according to any one of the preceding aspects the at least one lifting actuator (21) comprises a first and a second lifting actuator (21a, 21b) which are distinct and respectively active, in an independent manner, on the first and second devices (5, 6). In one aspect according to any one of the preceding aspects the first lifting actuator (21a) is configured to move the first device (5) along the first guide (11) of the frame close to and away from the base (2). In one aspect according to any one of the preceding aspects the second lifting actuator (21b) is configured to move the second device (6) along the second guide (12) of the frame close to and away from the base (2).

In one aspect according to any one of the preceding aspects, a preponderant part of the arm (7) of the first device (5) is extended along a main extension direction that is substantially rectilinear. In one aspect according to any one of the preceding aspects the first device (5), at least during a work condition in which the tool (8) of said first device (5) is adapted to contact the tire, is configured to allow the rotation of the respective arm (7) so that the main extension direction of the latter substantially intersects the rotation axis (Z) of the wheel (R).

In one aspect according to any one of the preceding aspects, a preponderant part of the arm (70) of the second device (6) is extended along a main extension direction that is substantially rectilinear. In one aspect according to any one of the preceding aspects the second device (6), at least during a work condition in which the tool (80) of said second device (6) is adapted to contact the tire, is configured to allow the rotation of the respective arm (70) so that the main extension direction of the latter substantially intersects the rotation axis (Z) of the wheel (R).

In one aspect according to any one of the preceding aspects the tire changer apparatus (1) comprises at least one translation actuator (31) active on the drive unit (3) and configured to move the latter along the pre-established direction (X) close to and away from the frame (4), between a plurality of work positions.

In one aspect according to any one of the preceding aspects the tire changer apparatus (1) comprises at least one rotation actuator active on said first and second devices (5, 6) and configured to allow the rotation of the arms (7, 70) of the latter around the respective axes (Y, Y'), between a plurality of work positions.

In one aspect according to any one of the preceding aspects the tire changer apparatus (1) comprises at least one control unit (50) active in commanding said translation actuator (31) configured to command the translation actuator (31), in order to move the drive unit (3) into a work position in which the tools (8, 80) of the first and second devices (5, 6) are capable of operating on the rim and/or tire of a wheel (R) mounted on the drive unit (3).

In one aspect according to any one of the preceding aspects the tire changer apparatus (1) comprises at least one control unit (50) active in commanding said rotation actuator, in which the control unit (50) is configured to command the rotation actuator in order to rotate the arms (7, 70) of the first and second devices (5, 6) with respect to their axes (Y, Y') and arranging the latter in an operative position in which the tools (8, 80) of the first and second devices (5, 6) are capable of operating on the rim and/or tire of a wheel (R) mounted on the drive unit (3).

In one aspect according to any one of the preceding aspects the control unit (50) is configured to command the rotation actuator to rotate the arms (7, 70) of the first and second devices (5, 6) and arranging the tool (8) of the first device (5) to a distance from the ideal plane (P) substantially identical to a distance between the tool (80) of the second device (6) and said ideal plane (P).

In one aspect according to any one of the preceding aspects the control unit (50) is configured to command the rotation actuator to rotate the arms (7, 70) of the first and second devices (5, 6) so as to arrange the main extension directions of said arms (7, 70) of said first and second devices (5, 6) substantially intersecting the rotation axis (Z) of the wheel (R).

In one aspect according to any one of the preceding aspects the at least one rotation actuator comprises at least one first and a second rotation actuator that are distinct and independent from each other. In one aspect according to any one of the preceding aspects the control unit (50) is configured to act by commanding said first and second rotation actuator to allow the independent rotation of the arms (7, 70) of the first and second devices (5, 6).

In one aspect according to any one of the preceding aspects the control unit (50) is configured to:
receiving, in inlet, at least one representative signal of a characteristic of a wheel (R),
as a function of said representative signal, commanding the translation actuator (31) to move the drive unit (3) in a pre-established work position.

In one aspect according to any one of the preceding aspects the control unit (50) is configured to receive, in inlet, said representative signal by means of at least one from among:
a manual insertion by an operator of a parameter representative of said characteristic of a wheel (R),
a measurement executed by means of one or more sensors connected to the control unit (50) and configured to emit said representative signal of a characteristic of a wheel (R).

In one aspect according to any one of the preceding aspects the control unit (50) is configured to command, depending on the work position reached by the drive unit (3) and/or as a function of a representative signal of a characteristic of a wheel (R), the first and the second rotation actuator to rotate the arms (7, 70) of the first and second devices (5, 6) so as to arrange the respective tools (8, 80) in an operative position in which they are capable of operating on a rim and/or a tire of a wheel (R) carried by the drive unit (3).

In one aspect according to any one of the preceding aspects the control unit (50) is configured to command, depending on the work position reached by the drive unit (3) and/or as a function of a representative signal of a characteristic of a wheel (R), the first and the second rotation actuator in an independent manner in order to rotate the arms (7, 70) of the first and second devices (5, 6) so as to arrange the respective tools (8, 80) in an operative position in which they are capable of operating on a rim and/or a tire of a wheel (R) carried by the drive unit (3).

In one aspect according to any one of the preceding aspects the control unit (50), following the rotation of the arms (7, 70), is configured to command the lifting actuator (21) to move at least one of said first and second devices (5, 6) along a direction substantially parallel to the rotation axis (Z) of the wheel (R) in order to bring at least one of the tools (8, 80) of said first and second devices (5, 6) in contact with the rim and/or the tire of the wheel (R) carried by the drive unit (3).

In one aspect according to any one of the preceding aspects the tire changer apparatus (1) comprises:
at least one translation actuator (31) active on the drive unit (3) and configured to move the latter along the predetermined direction (X) close to and away from the frame (4), between a plurality of work positions,
at least one interconnection system (60) configured to connect in movement the first and second devices (5, 6) with the drive unit (3), the interconnection system (60) being configured to rotate the arms (7, 70) of the first and of the second device (5, 6) during the movement of the drive unit (3) along the predetermined direction (X).

In one aspect according to the preceding aspect, the predetermined direction (X) lies on the ideal plane (P). In one aspect according to any one of the preceding aspects the interconnection system (60) comprises:
at least one lever (61) stably constrained to the first and second devices (5, 6) and configured to rotate the arms (7, 70) of the latter around their axes (Y, Y'),
at least one pusher (62) stably carried by the drive unit (3) and movable together with the latter along the predetermined direction (X).

In one aspect according to any one of the preceding aspects the lever and the pusher are engaged in motion with each other such that, following the movement of the drive unit (3) along the predetermined direction (X), the pusher can rotate the at least one lever and consequently the arms (7, 70) of the first and second devices (5, 6) around the respective axes (Y, Y').

In one aspect according to any one of the preceding aspects, at least one between said pusher (62) and lever (61) comprises a shaped guiding portion extended along a pre-established trajectory (T),
wherein the other between said lever and pusher is constrained to the shaped guiding portion and configured to be moved, during the movement of the drive unit (3) along the predetermined direction (X), along said trajectory (T) in order to allow the rotation of the lever (61) and consequently of the arms (7, 70) of the first and second devices (5, 6) around the respective axes (Y, Y').

In one aspect according to any one of the preceding aspects:

the pusher (62) comprises said shaped guiding portion having at least one groove (62*a*) extended along the pre-established trajectory (T), the lever (61) comprises at least one connection body (61*a*) with elongated shape, stably constrained to the first and/or second device (5, 6), the lever also comprising at least one projection (61*b*) engaged via sliding within the groove (62*a*) of the pusher (62), wherein, during the movement of the drive unit (3) along the predetermined direction (X) and consequently of the pusher (62), the projection (61*b*) of the lever (61) is configured to slide within the groove (62*a*) and guide in rotation said lever (61) with consequent rotation of the arms (7, 70) of the first and second devices (5, 6) around the respective axes (Y, Y').

In one aspect according to any one of the preceding aspects the at least one groove (62*a*) comprises a first and a second groove. In one aspect according to the preceding aspect the first and the second groove are extended along respective trajectories (T) lying on a plane. In one aspect according to the preceding aspect the lying plane of the first and second groove is orthogonal to the rotation axis (Z) of the wheel (R) and optionally orthogonal to the ideal plane (P). In one aspect according to any one of the preceding aspects the first and the second groove are arranged symmetrically with respect to each other, optionally with respect to the ideal plane (P). In one aspect according to any one of the preceding aspects the first and the second groove have identical shape and size.

In one aspect according to any one of the preceding aspects the lever (61) comprises a first connection body stably constrained to the first device (5), the first connection body terminally carrying the projection (61*b*) comprising at least one pin engaged via sliding within the first groove.

In one aspect according to any one of the preceding aspects the lever (61) comprises a second connection body stably constrained to the second device (6), the second connection body terminally carrying the projection (61*b*) comprising at least one pin engaged via sliding within the second groove.

In one aspect according to any one of the preceding aspects:

the pusher (62) comprises at least one pin, the lever (61) comprises at least one connection body (61*a*) with elongated shape, stably constrained to the first and/or second device (5, 6), the lever (61) comprising said shaped guiding portion extended along the pre-established trajectory (T) which is terminally carried by the connection body (61*a*).

In one aspect according to any one of the preceding aspects, during the movement of the drive unit (3) along the predetermined direction (X) and consequently of the pusher (62), the pin of the pusher (62) is configured to slide along the shaped guiding portion of the lever (61) and guide said lever (61) in rotation, with consequent rotation of the arms (7, 70) of the first and second devices (5, 6) around the respective axes (Y, Y').

In one aspect according to any one of the preceding aspects the drive unit (3) comprises an outer casing (3*c*) emerging from the base (2) parallel to the direction of rotation (Z) of the wheel (R), wherein the projection of the pusher (62) is defined by a portion of said casing (3*c*) of the drive unit (3), and wherein the guiding portion of the lever (61) comprises a slot within which the casing (3*c*) of the drive unit (3) is engaged.

In one aspect according to any one of the preceding aspects the at least one lever comprises a first and a second lever, the first lever comprises a connection body (61*a*) constrained to the first device (5) and also comprises a slot engaged with the casing (3*c*) of the drive unit (3), the second lever comprises a respective connection body (61*a*) constrained to the second device (6) and also comprises a slot, it too engaged with the casing (3*c*) of the drive unit (3).

In one aspect according to any one of the preceding aspects, during the movement of the drive unit (3) and consequently of the support casing (3*c*) along the predetermined direction (X), the casing (3*c*) is configured to slide within the slots of the first and second lever in order to guide the latter in rotation and consequently rotate the arms (7, 70) of the first and second devices (5, 6) around the respective axes (Y, Y').

In one aspect according to any one of the preceding aspects the interconnection system (60) comprises at least one cam configured to transform the translational motion of the drive unit (3) into a rotational motion of the arms (7, 70) of the first and second devices (5, 6).

In one aspect according to any one of the preceding aspects the wheel (R) mountable on the drive unit (3) is of the type comprising:

a rim comprising a hub configured to allow the assembly of the rim on the vehicle and a first and second perimeter edge that are opposite and configured to allow the engagement of a tire, a tire comprising:

a first bead configured to be engaged with the first perimeter edge of the rim, a second bead configured to be engaged with the second perimeter edge of the rim, a tread configured to define, in use conditions on a vehicle, the element of contact of the tire with the asphalt, a first flank which connects the first bead to the tread, a second flank which connects the second bead to the tread.

In one aspect according to any one of the preceding aspects the tool (8) of the first device (5) comprises a pressing element configured to act thrustingly on the first bead of the tire in order to allow at least one partial detachment of said first bead from the first perimeter edge of the rim.

In one aspect according to any one of the preceding aspects the tool (80) of the second device (6) comprises an inserter-extractor element configured to be radially interposed between the first perimeter edge of the rim and the first bead of the tire in order to allow the engagement-disengagement of said first bead from the first perimeter edge of the rim.

In one aspect according to any one of the preceding aspects the pressing element comprises a rotary body configured to define a friction of rolling type with the tire, the rotary body being configured to rotate around an axis thereof in an operative condition in which the wheel (R) revolves around the rotation axis (Z) and the rotary body contacts the tire. In one aspect according to any one of the preceding aspects the rotary body comprises at least one selected from among: a disc, a cylinder, a ball.

In one aspect according to any one of the preceding aspects the tire changer apparatus (1) comprises at least one third device (90) comprising:

at least one arm (91) hinged to the frame (4) and configured to rotate around a respective axis (Y) substantially parallel to the rotation axis (Z) of the wheel (R), at least one tool (92) terminally carried by the arm (91) and configured to operate on a rim and/or a tire of a wheel (R) carried by the drive unit (3), wherein the third device (90) is configured to arrange the respective tool (92) on an opposite side of the tool (80) of the second device (6) with respect to said ideal plane (P).

In one aspect according to any one of the preceding aspects the third device (90) is configured to arrange the rotation axis (Y) of its arm (91) on an opposite side with respect to the rotation axis (Y') of the arm (70) of the second device (6) with respect to said ideal plane (P).

In one aspect according to any one of the preceding aspects the rotation axis (Y) of the arm (91) of the third device (90) coincides with the rotation axis (Y) of the arm (7) of the first device (5).

In one aspect according to any one of the preceding aspects the tool (92) of the third device (90) is arranged at a substantially fixed distance from the rotation axis (Y) of the respective arm (91) of the same third device (90).

In one aspect according to any one of the preceding aspects the first and the third device (5, 90), at least during a work condition in which both the tools of said first and third devices are adapted to contact the tire, are configured to move the respective tools (8, 92) such that the distance present between the tool (8) of the first device (5) and the ideal plane (P) results substantially identical to the distance present between the tool (92) of the third device (90) and said ideal plane (P).

In one aspect according to any one of the preceding aspects the rotation axis (Y) of the arm (91) of the third device (90) and a geometric center of the tool (92) of the same third device (90) define a virtual plane that is tilted with respect to the ideal plane (P) by an angle comprised between 10° and 45°, in particular comprised between 15° and 30°.

In one aspect according to any one of the preceding aspects the first and the third device (5, 90), at least during a work condition in which both the tools (8, 92) of said first and third devices are adapted to contact the tire, are configured to move the respective tools such that the angles of the virtual planes, respectively of the first and of the third device, are substantially identical in relation to the ideal plane (P).

In one aspect according to any one of the preceding aspects the third device (90) is movable with respect to the frame (4) along a direction substantially parallel to the rotation axis (Z) of the wheel (R).

In one aspect according to any one of the preceding aspects the third device (90) comprises at least one engagement portion (90a) hinged to the first guide (11) of the frame (4) and also configured to allow the translation of the third device (90) along said first guide (11).

In one aspect according to any one of the preceding aspects the third device (90) is movable via sliding along the first guide (11) independent of the relative movement via sliding of the first device (5) along said same first guide (11).

In one aspect according to any one of the preceding aspects the at least one lifting actuator (21) comprises at least one third lifting actuator (21c) that is distinct and independent of the first and second lifting actuators (21a, 21b), wherein the third lifting actuator (21c) is configured to move the third device (90) along the first guide (11) of the frame (4) close to and away from the base (2).

In one aspect according to any one of the preceding aspects at least one preponderant part of the arm (91) of the third device (90) is extended along a main extension direction that is substantially rectilinear, wherein the third device (90), at least during a work condition in which the tool (92) of said third device (90) is adapted to contact the tire, is configured to allow the rotation of the respective arm (91) so that the main extension direction of the latter substantially intersects the rotation axis (Z) of the wheel (R).

In one aspect according to any one of the preceding aspects the third device (90) is spaced from the first device (5) along said first guide (11). In one aspect according to any one of the preceding aspects the first device (5) is placed at a distance from the base (2) greater than a distance between said base (2) and the third device (90). In one aspect according to any one of the preceding aspects the third device (90) is integral with the first device (5) in the rotation motion around the axis (Y). In one aspect according to any one of the preceding aspects the first and second devices (5, 90) are configured to integrally rotate around the same first guide (11) of the frame (4).

In one aspect according to any one of the preceding aspects the drive unit (3) comprises:

at least one motorized shaft (3a) emerging from the base (2) and extended between a first and a second end portion, wherein the shaft (3a) is engaged with the base (2) at the first end portion, at least one support plate (3b) constrained to the motorized shaft (3a) at the second end portion, on the opposite side with respect to the base (2), said connection plate (3b) being configured to stably support and engage a rim of a wheel (R).

In a further aspect a process is provided for disassembly of a tire from a rim of a wheel of a vehicle by means of a tire changer apparatus (1) in accordance with any one of the preceding aspects.

In one aspect according to any one of the preceding aspects the wheel (R) is of the type comprising:

a rim comprising a hub configured to allow the assembly of the rim on the vehicle and a first and second perimeter edge that are opposite and configured to allow the engagement of a tire, a tire comprising:

a first bead configured to be engaged with the first perimeter edge of the rim, a second bead configured to be engaged with the second perimeter edge of the rim, a tread configured to define, in use conditions on a vehicle, the element of contact of the tire with the asphalt, a first flank which connects the first bead to the tread, a second flank which connects the second bead to the tread, wherein the disassembly process comprises the following steps:

mounting the wheel (R) on the drive unit (3), moving the drive unit (3) along the predetermined direction (X), rotating the arms (7, 70) of the first and second devices (5, 6) such that the respective tools (8, 80) can operate on the rim and/or tire of the wheel (R) carried by the drive unit (3).

In one aspect according to any one of the preceding aspects the step of rotating the arms is carried out as a function of a work position reached by the drive unit (3) and/or as a function of a representative signal of a characteristic of a wheel (R).

In one aspect according to any one of the preceding aspects the representative signal of a characteristic of the wheel (R) can be obtained by means of:

a manual insertion by an operator of a parameter representative of at least one characteristic of the wheel (R), a measurement executed by means of one or more sensors, optionally connected to a control unit (50), configured to emit said representative signal of a characteristic of a wheel (R).

In one aspect according to any one of the preceding aspects the characteristic of the wheel (R) can comprise at least one from among:

a diameter of the rim, a diameter of the tire, the width of the rim, wherein the width of the rim is defined by a distance between the first and the second perimeter edge of said rim, the width of the tire, wherein the width of the tire is defined by a distance between the first and the second flank of the tire.

In one aspect according to any one of the preceding aspects, the process also comprises the steps of:

rotating the wheel (R) around the rotation axis (Z), pressing the first bead of the tire by means of the tool (8) of the first device (5) so as to generate a detachment of the first bead from the first perimeter edge of the rim, following the detachment of the first bead from the first edge of the rim, radially interposing the tool (80) of the second device (6) between said first bead and the first perimeter edge of the rim, extracting at least part of the first bead from the first perimeter edge of the rim by means of said tool (80) of the second device (6), following the partial extraction of the first bead from the first perimeter edge of the rim and during the radial interposition of the tool (80) of the second device (6) between said first bead and the first perimeter edge of the rim, rotating the wheel (R) around the rotation axis (Z) so as to completely disengage the first bead from the first perimeter edge of the rim.

In one aspect according to any one of the preceding aspects, following the assembly of the wheel on the drive unit (3) and before rotating the same, the process comprises the steps of:

acquiring at least one first characteristic representative of at least one from between the diameter of the rim and the diameter of the tire of the wheel mounted on the drive unit (3), as a function of said first characteristic, executing the movement of the drive unit (3) along the predetermined direction (X) so as to position the wheel in a desired work position.

In one aspect according to any one of the preceding aspects, the step of rotation of the arms (7, 70) of the first and second devices (5, 6) is carried out simultaneously with or after the movement of the drive unit (3) along the predetermined direction (X), such that the main extension direction of the arms (7, 70) of the first and second devices (5, 6), at least during the rotation of the wheel around the rotation axis (Z), substantially intersects said rotation axis (Z) of the wheel.

In one aspect according to any one of the preceding aspects, following the radial interposition of the tool (80) of the second device (6) between said first bead and the edge of the rim, the process provides for the detachment of the first device (5) of the wheel (R).

In one aspect according to any one of the preceding aspects, following the radial interposition of the tool (80) of the second device (6) between said first bead and the edge of the rim, the first device (5) is moved away from the wheel by means of the movement of the same along the first guide (11) of the frame (4).

In one aspect according to any one of the preceding aspects the step of radially interposing the tool (80) of the second device (6) between said first bead and the edge of the rim provides for moving the second device (6) along said second guide (12) close to the wheel (R).

In one aspect according to any one of the preceding aspects the step of extracting at least part of the first bead from the first perimeter edge of the rim comprises at least one of the following sub-steps:

moving the wheel (R) by means of the drive unit (3) along the pre-established direction (X), optionally lying on the ideal plane (P), during the radial interposition of the tool (8) of the second device (6) between said first bead and the edge of the rim, moving the tool (80) of the second device (6) along the second guide (12) away with respect to the base (2). i.e. according to an exit direction of the tool (80) from the rim of the wheel.

In one aspect according to any one of the preceding aspects the process also comprises the step of pressing the second bead of the tire by means of the tool (92) of the or of a third device (90) so as to generate a detachment of the second bead from the second perimeter edge of the rim.

In one aspect according to any one of the preceding aspects, the step of detachment of the second bead is carried out before the step of radial interposition of the tool (80) of the second device (6) between said first bead and the edge of the rim.

In one aspect according to any one of the preceding aspects, following the complete disengagement of the first bead from the first perimeter edge of the rim, the process comprises the following steps:

stopping the rotation of the wheel (R) around its rotation axis (Z), at least partly placing the second bead of the tire in contact with the first perimeter edge of the rim, following the contact of the second bead of the tire with the first perimeter edge of the rim, radially interposing the tool (92) of the third device (90) between said second bead and the first perimeter edge of the rim in order to allow said tool (92) of the third device (90) to extract at least part of the second bead from the first perimeter edge of the rim, following the partial extraction of the second bead from the first perimeter edge of the rim and during the radial interposition of the tool (92) of the third device (90) between said second bead and the first perimeter edge of the rim, rotating the wheel (R) around the rotation axis (Z) so as to completely disengage the tire from the rim.

In a further aspect, a process is provided for assembly of a tire on a rim of a wheel of a vehicle by means of a tire changer apparatus (1) in accordance with any one of the preceding aspects.

In one aspect according to any one of the preceding aspects the wheel (R) is of the type comprising:

a rim comprising a hub configured to allow the assembly of the rim on the vehicle and a first and second perimeter edge that are opposite and configured to allow the engagement of a tire, a tire comprising:

a first bead configured to be engaged with the first perimeter edge of the rim, a second bead configured to be engaged with the second perimeter edge of the rim, a tread configured to define, in use conditions on a vehicle, the element of contact of the tire with the asphalt, a first flank which connects the first bead to the tread, a second flank which connects the second bead to the tread, wherein the assembly process comprises the following steps:

placing the second bead of the tire in contact with the first perimeter edge of the rim, radially interposing the tool (8, 92) of the first or third device (5, 90) between the second bead of the tire and the first perimeter edge of the rim, moving the drive unit (3) along the predetermined direction (X), optionally lying on the ideal plane (P), so that said tool can allow the engagement of a part of the second bead with the first perimeter edge of the rim, following the partial engagement of the second bead with the first perimeter edge of the rim and during the radial interposition of the tool between said second bead and the first perimeter edge of the rim, rotating the wheel (R) around the rotation axis (Z) so as to completely engage the second bead to the first perimeter edge of the rim, wherein, following the complete engagement of the second bead with the first perimeter edge of the rim, said second bead results interposed between the first and the second perimeter edge of the rim, arranging the second bead at the second perimeter edge of the rim and arranging the first bead at the first perimeter edge of the rim, pressing, with the tool (8, 80) of the first and/or second device (5, 6), the first bead towards the second bead of the tire up to the partial engagement of the first bead with the first perimeter edge of the rim, following the partial engagement of the first bead to the first perimeter edge of the rim and during the action of pressing the tool of the first and/or second device on the first bead, rotating the wheel (R) around the rotation axis (Z) so as to completely engage the first bead to the first perimeter edge of the rim, wherein, following the complete engagement of the first bead to the first perimeter edge of the rim, the first and the second bead both result interposed between the first and the second perimeter edge of the rim.

Embodiments described herein may provide a tire changer apparatus that is structurally robust, capable of effectively carrying out the operations of assembly and disassembly of a tire from a rim of a wheel. The tire changing apparatus may be extremely flexible in use, in particular capable of ensuring the effective and quick assembly-disassembly of a wide array of tires with different diameter and width. The tire changing apparatus may also be capable of operating safely without damaging the latter nor the tools of the apparatus itself. In some implementations, the tire changing apparatus may have a simple and compact structure, which therefore has limited production costs and which at the same time allows reducing maintenance interventions to a minimum.

BRIEF DESCRIPTION OF DRAWINGS

Several embodiments and several aspects of the finding will be described herein below with reference to the enclosed drawings, provided only as a non-limiting example, in which:

In FIG. 4, an operative condition is schematized in which a pair of tools of the tire changer apparatus is arranged at a wheel carried by a drive unit of the same tire changer apparatus;

DETAILED DESCRIPTION

Definitions

Figure 1:
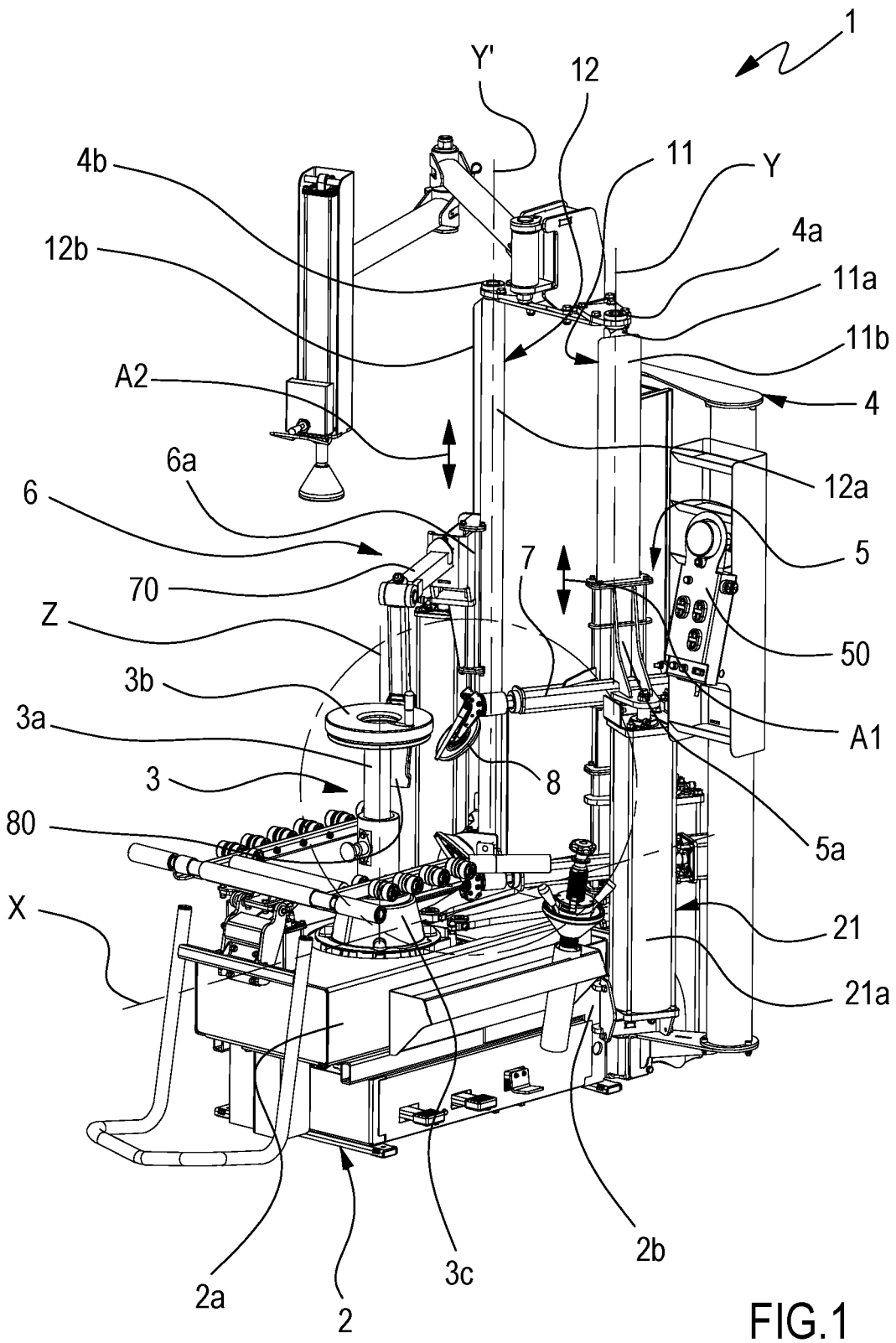
FIGS. 1 and 2 are perspective views of a tire changer apparatus in accordance with the present invention.
Figures 1A, 2A:
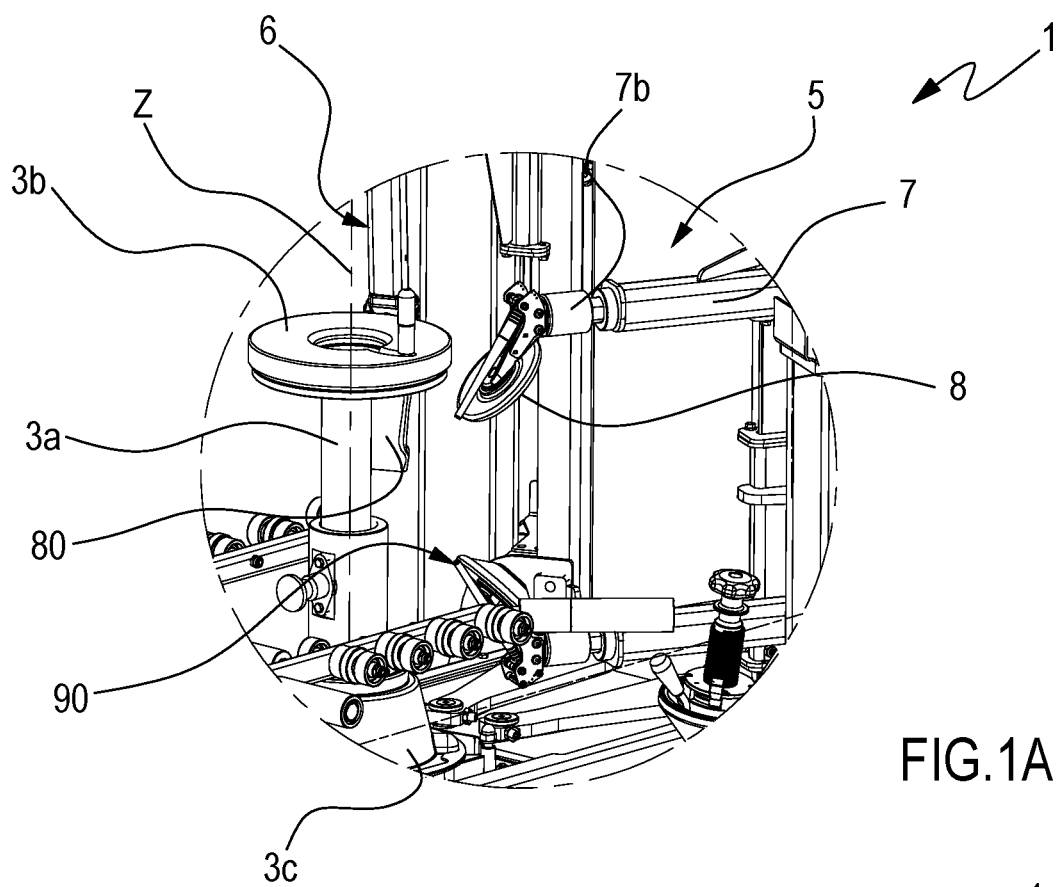
FIGS. 1A and 2A are detailed views respectively of the tire changer apparatus of FIGS. 1 and 2.
Figure 2:
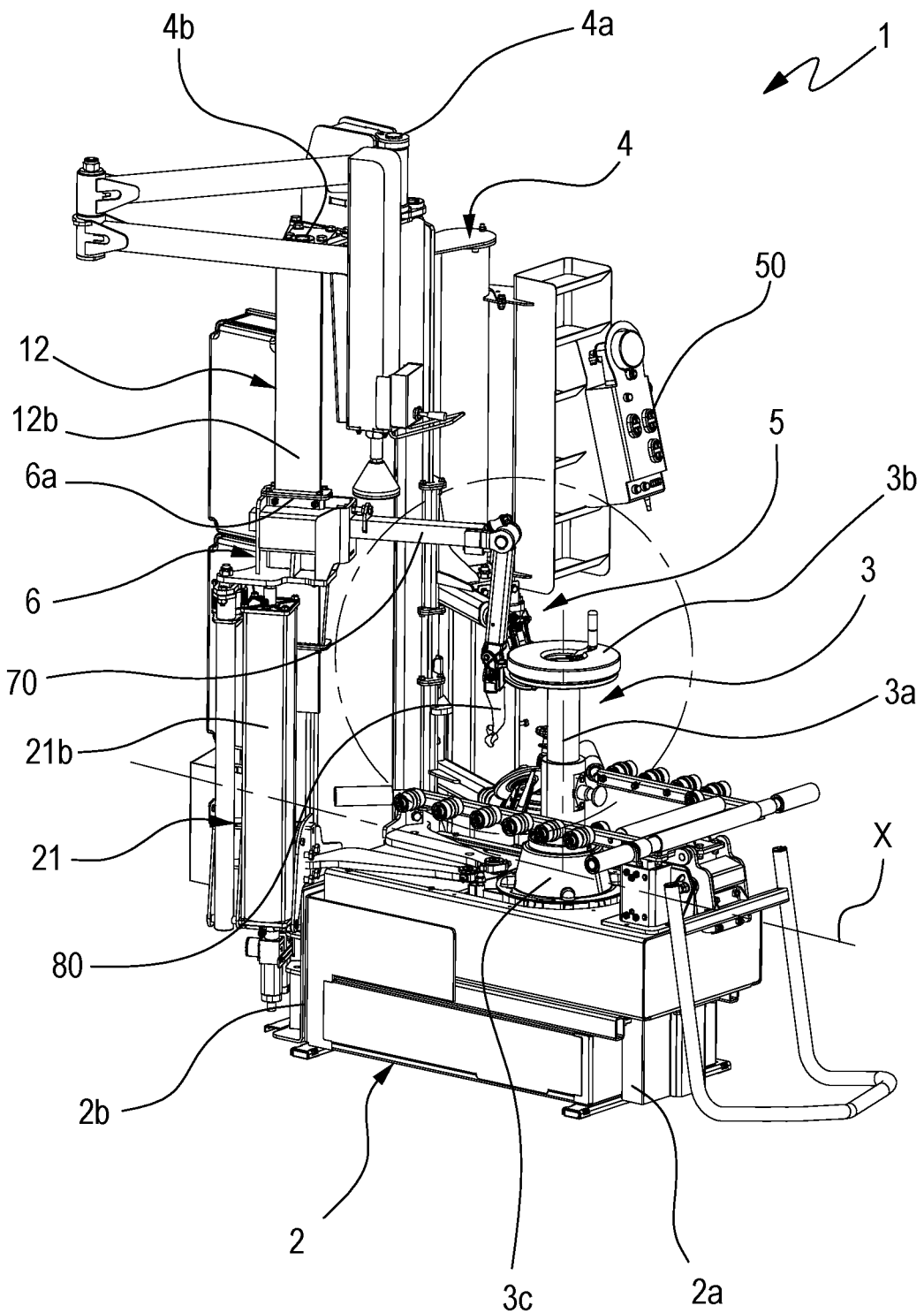
Figure 3:
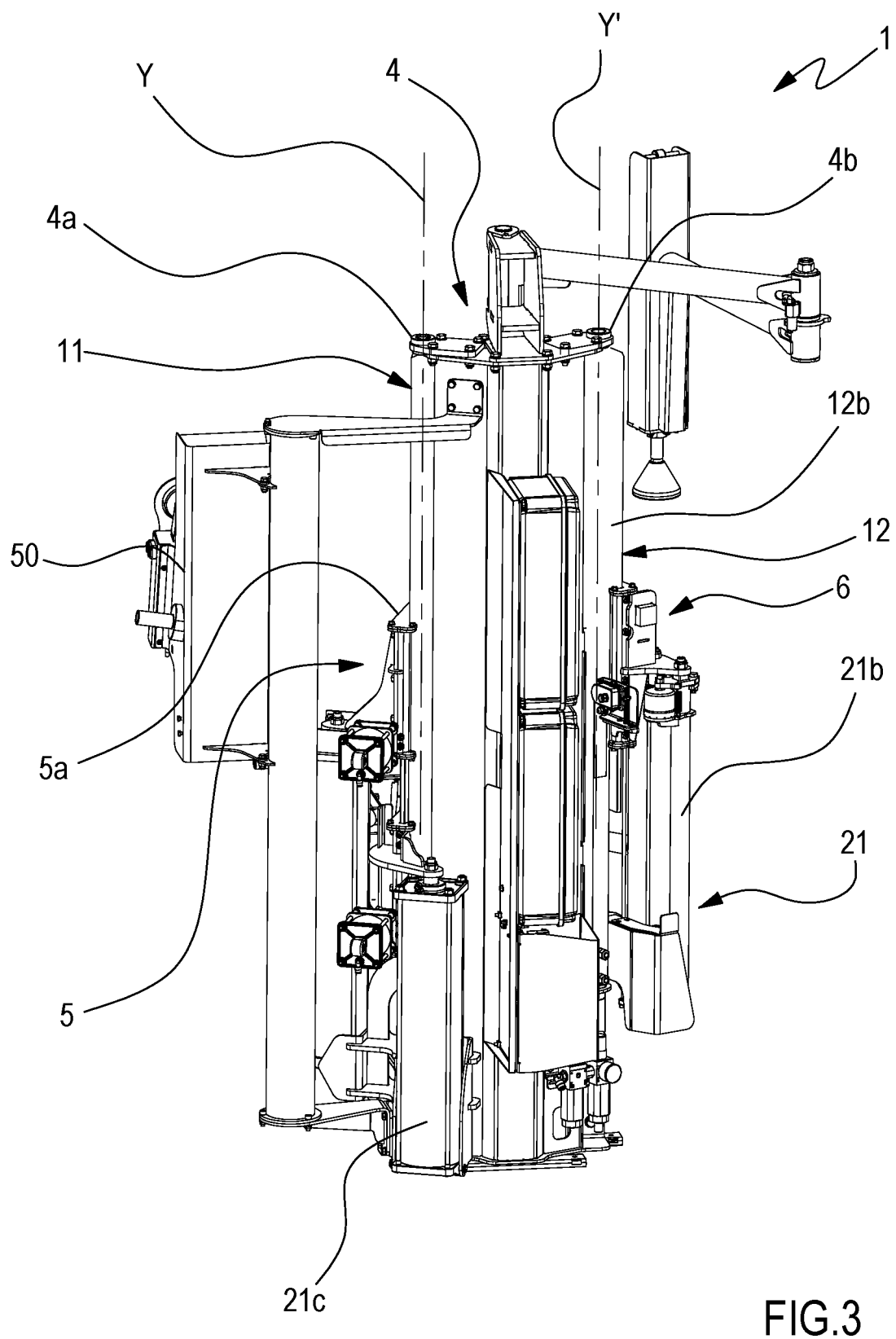
FIG. 3 is a further perspective view of a tire changer apparatus in accordance with the present invention.

The terms "horizontal" or "vertical", used in relation to components of the tire changer apparatus, refer to a use condition of the same during which the apparatus executes, or is usable for executing, a procedure of assembly and/or disassembly of a tire from a rim of a wheel.

The tire changer apparatus described and claimed herein below can comprise/use at least one control unit set for controlling operative conditions implemented by the same apparatus and/or for controlling the steps of the process of disassembly and assembly of a tire from/on a rim of a wheel. The control unit can be a single unit or be formed by a plurality of separate control units depending on the design selections and on the operative needs.

With 'control unit' it is intended component of electronic type which can comprise at least one of the following: a digital processor (CPU), a circuit of analog type, or a combination of one or more digital processors with one or more circuits of analog type. The control unit can be "configured" or "programmed" for executing several steps: this can be attained in practice with any means that allows configuring or programming the control unit. For example, in the case of a control unit comprising one or more CPUs and one or more memories, one or more programs can be stored in suitable memory banks connected to the CPU or to the CPUs; the program or programs contain instructions which, when executed by the CPU or by the CPUs, program or configure the control unit in order to execute the operations described in relation to the control unit. Alternatively, if the control unit is or comprises circuitry of analog type, then the circuit of the control unit can be designed in order to include circuitry configured, in use, for processing electrical signals so as to execute the steps relative to the control unit.

Parts of the process described herein can be attained by means of a data processing unit, or control unit, which can be technically substituted with one or more computers conceived for executing a portion of software or firmware program loaded on a memory support. Such software program can be written in any one programming language of known type. The computers, if there are two or more of these, can be connected together by means of a data connection such that their computing powers are shared in any manner; the same computers can therefore be installed in positions that are even geographically different, attaining a distributing computing environment by means of the aforesaid data connection.

The data processing unit, or control unit, can be a processor of general purpose type, configured to execute one or more parts of the process identified in the present document through the software or firmware program, or be an ASIC or dedicated processor or a FPGA, specifically programmed for executing at least part of the operations of the process described herein.

The memory support can be non-transient and can be inside or outside the processor, or control unit, or data processing unit, and can—specifically—be a memory geographically situated remotely with respect to the electronic processor. The memory support can also be physically divided into multiple portions, or in cloud form, and the software or firmware program can physically provide for portions stored on memory portions that are geographically divided from each other.

With "actuator" it is intended any one device capable of causing a movement on a body, e.g. upon command of the control unit (reception by the actuator of a command sent by the control unit). The actuator can be of electric type (e.g. an electric motor), pneumatic type, mechanical type (e.g. with spring), oil-pressure type or of still another type.

With 'wheel' (R) it is intended an assembly comprising a rim coupled to a tire.

With 'rim' it is intended a component adapted to support a tire and comprising an anchorage zone where a hub is defined for the engagement with an axle of the wheel of a vehicle. The rim externally comprises a seat, extended in radially outer position and axially delimited by a first and by a second perimeter edge: at the seat, the tire is engaged.

With 'tire' it is intended any one covering element, e.g. multilayer, mountable at the seat of a rim of a vehicle. The tire comprises:

a first bead configured to be engaged with the first edge of the rim, a second bead configured to be engaged with the second edge of the rim, a tread configured to define the contact element of the tire with the ground, a first flank which connects the first bead to the tread, a second flank which connects the second bead to the tread, The distance between the first or second bead from the tread essentially defines the height of the tire, while the distance between the first and second flanks essentially defines the width of the tire, which substantially coincides with the width of the rim defined by the distance between the above-described first and second edges.

It is observed that in the present detailed description, corresponding parts illustrated in the various figures are indicated with the same reference numbers. The figures could illustrate embodiments by means of representations that are not in scale; therefore, parts and components illustrated in the figures might only regard schematic representations.

Tire Changer Apparatus

Reference number 1 overall indicates a tire changer apparatus for the assembly and/or the disassembly of tires from a rim of a wheel R. As is visible in the enclosed figures, the apparatus 1 comprises a base 2 defining the support element of the various parts of the apparatus 1 described herein below.

The tire changer apparatus 1 also comprises a drive unit 3, coupled to the base 2, configured to receive and engage a wheel R; the drive unit 3 is also configured to allow the rotation of the wheel R around a rotation axis Z. The drive unit 3 comprises a motorized shaft 3a emerging from the base 2 and extended between a first and a second end portion; the first end portion of the motorized shaft 3a is placed at the base 2 while the second end portion, emerging from the base 2, carries a plate or other support means 3b in order to stably support and engage a rim of a wheel R. In detail, the support plate 3b is configured to be constrained directly to the anchorage zone of the rim and rotate integrally with the motorized shaft 3a around an axis coinciding with the rotation axis Z. In the enclosed figures, the rotation axis Z of the wheel is extended, in use conditions of the tire changer apparatus 1, along a direction that is substantially vertical; nevertheless it might be possible to arrange a drive unit 3, configured to rotate the wheel around an axis Z that is substantially horizontal or around an axis that is tilted, by an angle comprised between 0° and 90°, with respect to a horizontal reference plane. The drive unit 3 can also comprise an external casing 3c in tubular form, optionally with circular section; the casing 3c can emerge from the base 2, parallel to the direction of rotation Z, and at least partly enclose the motorized shaft 3a so as to define a case adapted to at least partly enclose and protect the motorized shaft 3a.

Figure 7:
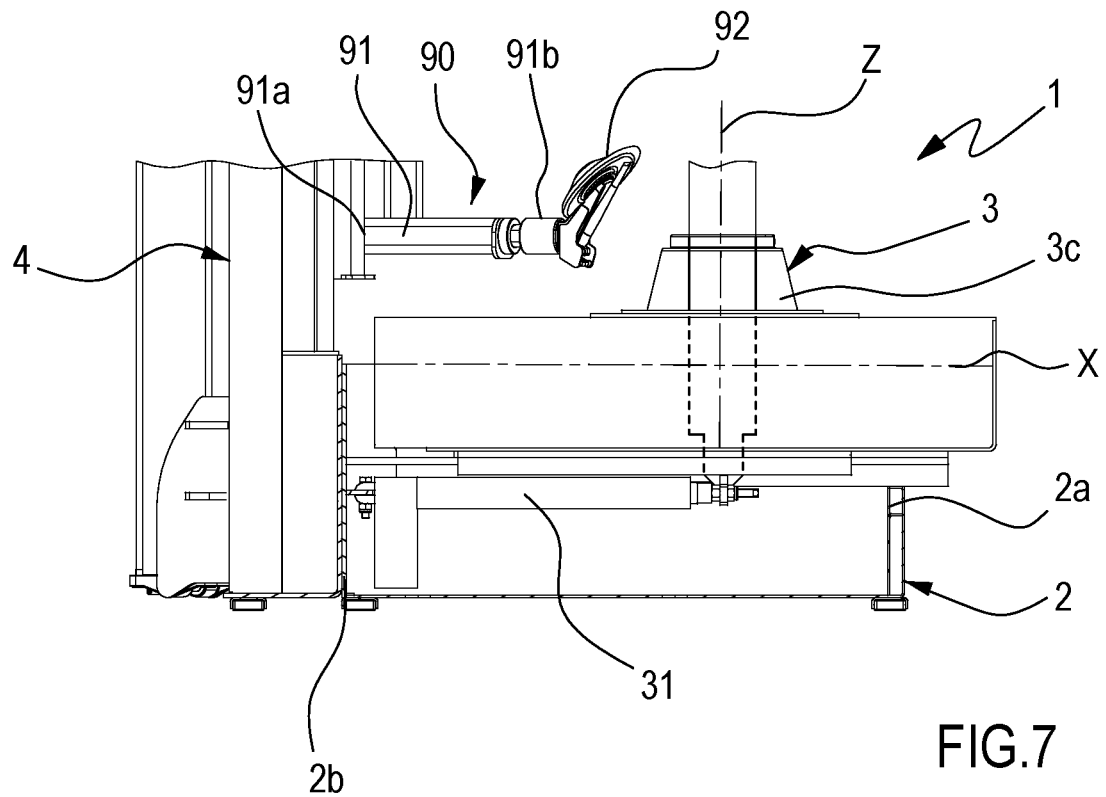
FIG. 7 is a detailed side view of a tire changer apparatus in accordance with the present invention.

As is visible for example in FIG. 1, the drive unit 3 is arranged in interposition between a front portion 2a and a rear portion 2b of the base 2. The drive unit 3 is movable with respect to the base 2 along a predetermined direction X that is transverse, optionally orthogonal, to the rotation axis Z, close to and away from the rear portion 2b of the base 2. In particular, the apparatus 1 comprises at least one translation actuator 31 (FIG. 7)—for example comprising a pneumatic or oil-pressure actuator or an actuator driven by an electric motor—configured to act thrustingly on the drive unit 3 so as to allow the movement thereof (the translation) along the predetermined direction X. As is for example visible in FIG. 7, the translation actuator 31 can be constrained on one side to a fixed portion of the base 2 and on the other side to the drive unit 3; the translation actuator 31 can be placed at the first end portion of the motorized shaft 3a of the drive unit 3, as is for example illustrated in FIG. 7.

The rotation axis Z of the wheel R and the predetermined direction X of movement of the drive unit 3 define an ideal plane P (see FIGS. 4, 5, 9-11) of movement of the drive unit 3. In the embodiment of the tire changer apparatus 1 illustrated in the enclosed figures, the ideal plane P is, in a non-limiting manner, substantially vertical and is also extended along a direction of connection of the front portion 2a with the rear portion 2b of the base 2. Nevertheless, it might be possible to provide for a tire changer apparatus 1 in which the ideal plane P is substantially horizontal or tilted by an angle comprised between 0° and 90° with respect to a horizontal reference plane. With regard instead to the pre-established direction X of movement of the drive unit 3, this is extended, in a non-limiting manner, along a horizontal direction.

As is visible from the enclosed figures, the tire changer apparatus 1 also comprises a frame 4, it too emerging from the base 2 substantially at the rear portion 2b (FIG. 1). The frame 4 is fixed to the base 2 in a distal position with respect to the drive unit 3 which is movable along the predetermined direction X close to and away from the frame 4. The frame 4 is mainly extended along a direction substantially parallel to the rotation axis Z of the wheel R. In the enclosed figures, a frame 4 was illustrated that was extended, in a non-limiting manner, along a vertical direction.

The frame 4 supports at least one first and a second device 5, 6 (see for example FIGS. 1, 2, 4, 5 and 8) which, as better described herein below, are configured to operate on a rim and/or on a tire in order to allow the assembly and/or the disassembly of the latter on/from said rim.

In detail, the frame 4 comprises at least one first and one second guide 11, 12 (FIG. 1) adapted to stably support the first and second devices 5, 6; the guides 11 and 12 are placed opposite each other with respect to the ideal plane P: the first and second guides 11, 12 are both spaced from the ideal plane P and in particular placed mirrored with respect to each other. In more detail, the first guide 11 is arranged at a distance from the ideal plane substantially identical to the distance present between the second guide 12 and the same ideal plane P. The first and second guides 11, 12 are extended one parallel to the other and in particular along directions parallel to the rotation axis Z of the wheel.

In detail, the first guide 11 comprises a shaft 11a extended along an axis and constrained to a first hinge 4a of the frame (FIG. 1). The shaft 11a of the first guide 11 is movable via rotation around its axis, due to a constraint of hinge type with the frame 4. The first guide 11 also comprises a track 11b stably constrained to the shaft 11a and extended parallel to the latter; the track 11b is fixed to the shaft 11a and hence it is also movable via rotation around the axis of the shaft 11a. The track 11b comprises a flat plate extended substantially over the entire axial extension of the shaft 11a (FIG. 1). As better described herein below, the track 11b is configured to directly carry the first device 5 and allow the latter to slide along a direction A1 (FIG. 1) parallel to the axis of the shaft 11a and hence parallel to the rotation axis Z of the wheel R. In more detail, the first guide 11 and the first device 5 are engaged by means of a constraint of sliding block type; the first device 5 is in fact slidably movable along the track 11b and blocked in the rotation with respect to the latter: the rotation of the shaft 11a, with respect to the first hinge 4a of the frame 4 around its axis, generates a corresponding rotation of the track 11b and hence of the first device 5. Indeed, the first device 5—in addition to slidably moving (via translation) along a direction A1 parallel to the rotation axis Z of the wheel—is also movable via rotation around the axis of the shaft 11a of the first guide 11.

In the same manner, the second guide 12 comprises a shaft 12a extended along an axis and constrained to a second hinge 4b of the frame 4 (FIG. 1). In fact, the shaft 12a of the second guide 12 is movable via rotation, due to the constraint of hinge type with the frame 4, around its axis. The second guide 12 also comprises a track 12b stably constrained to the shaft 12a and extended parallel to the latter; the track 12b is fixed to the shaft 12a and hence it is also movable via rotation around the axis of the shaft 12b. The track 12b comprises a flat plate extended substantially over the entire axial extension of the shaft 12a of the second guide 12 (FIG. 1). As better described herein below, the track 12b of the second guide 12 is configured to directly constrain the second device 6 and allow the latter to slide along a direction A2 (FIG. 1) parallel to the axis of the shaft 12a of the second guide 12 and hence parallel to the rotation axis Z of the wheel. Also the second guide 12 and the second device 6 are engaged by means of a constraint of sliding block type; the second device 6 is in fact slidably movable along the track 12b of the second guide 12 and blocked in rotation with respect to the latter: the rotation of the shaft 12a, with respect to the second hinge 4b of the frame 4 around its axis, generates a corresponding rotation of the track 12b of the second guide and hence of the second device 6. In fact, the second device 6—in addition to being slidably movable (via translation) along a direction parallel to the rotation axis Z of the wheel—is also movable via rotation around the axis of the shaft 12a of the second guide 12.

Illustrated in the enclosed figures, in a non-limiting manner, are a first and a second guide 11, 12 placed symmetrically with respect to the ideal plane P and having structures with substantially identical shape and size.

The axial movement of the first and of the second device 5, 6 is generated by at least one lifting actuator 21 (FIGS. 1 and 2): such actuator 21 is configured to allow the movement of at least one of said first and second devices 5, 6 with respect to the base 2 along a direction substantially parallel to the rotation axis Z of the wheel R. In particular, the at least one lifting actuator 21 comprises a first and a second lifting actuator 21a, 21b (see FIGS. 1 and 2) that are distinct from each other and respectively active, in an independent manner, on the first and on the second device 5, 6. In particular, the first lifting actuator 21a is configured to move the first device 5 along the first guide 11 of the frame 4 close to and away from the base 2 while the second lifting actuator 21b is configured to move the second device 6 along the second guide 12 of the frame 4 close to and away from the base 2. As is visible for example in FIGS. 1 and 2, the tire changer apparatus 1 can comprise a control unit 50 (which in the enclosed figures has been schematized in a non-limiting manner as a control panel placed on the side of the base 2 and of the frame 4) that is connected and active in commanding the first and the second lifting actuator 21a, 21b; in particular, the control unit 50 is configured to command, in an independent manner, the lifting actuators 21a, 21b, so that the first and second devices 5, 6 can slide along the guides 11, 12 in an independent manner. For example, during the step of disassembly of the tire, the control unit 50 can command the first lifting actuator 21a to move the first device 5 along the first guide 11 such that said first device 5 can contact the tire and simultaneously command the second lifting actuator 21b to maintain the second device 6 in a raised position in which the latter is spaced from the tire; afterwards, the control unit 50 can for example command, to the first lifting actuator 21a, to move the first device 5 along the first guide 11 away from the tire and simultaneously command the second lifting actuator 21b to move the second device 6 close to the tire such that said device 6 can come into contact with the tire itself The control unit 50 is also connected to the translation actuator 31, which is independent of the first and second lifting actuators 21a, 21b and active in commanding the drive unit 3; the control unit 50 is configured to command the translation actuator 31 to move the drive unit 3 along the pre-established direction X and to independently command a respective movement to at least one between said first and second lifting actuators 21a, 21b. The control unit 50 is nevertheless capable of monitoring and controlling the position of the drive unit 3 and hence command, in an independent manner and as a function of the processing to be executed on the wheel R, the movement of at least one between said first and second lifting actuators 21a, 21b.

As is visible in the enclosed figures, the first device 5 comprises an arm 7 hinged to the frame 4 and configured to rotate around an axis Y substantially parallel to the rotation axis Z of the wheel R. In particular, the arm 7 is extended between a first and a second end portion 7a, 7b (see for example FIGS. 1, 4 and 5); at the first end portion 7a, the arm 7 defines the engagement portion 5a of the first device 5 with the first guide 11. In detail, the engagement portion 5a defined by said first end portion of the arm 7 comprises a support, having substantially C-shaped section, engaged with the track 11b of the first guide 11. The support allows the arm 7 to slide along the track and to rotate together with the latter around the axis of the shaft 11a, coinciding therefore with the rotation axis Y of the first device 5. The rotation axis Y of the arm 7 of the first device 5 is arranged at a pre-established distance D1 (FIGS. 9 and 10) from the ideal plane P greater than 100 mm, optionally comprised between 150 and 250 mm. Such distance coincides with the distance present between the axis of the shaft 11a of the first guide 11 and the ideal plane P.

As is visible in the enclosed figures, the arm 7 of the first device 5 can be extended, in a non-limiting manner, along a main extension direction that is substantially rectilinear; nevertheless, it may be possible to make arms 7 of different shape and size. In the event that the arm 7 is extended along a rectilinear direction, it is also possible to define a tilt angle of said main extension direction with the ideal plane P to essentially define the tilt of the arm 7 with respect to said plane P. The first device 5 is in particular configured to rotate the arm 7 around its axis Y such that the arm 7 can define, with the ideal plane P, an angle comprised between 10° and 45°, optionally between 15° and 30°. In particular, as better described herein below, the first device 5, at least during a work condition in which said first device 5 is adapted to contact the tire, is configured to allow the rotation of the respective arm 7 so that the main extension direction of the latter substantially intersects the rotation axis Z of the wheel R (see for example FIGS. 9 and 10).

The first device 5 also comprises a tool 8 terminally carried by the arm 7 and configured to operate on a rim and/or a tire of a wheel R carried by the drive unit 3. In detail, the tool 8 of the first device 5 is arranged at the second end portion 7b of the arm 7 of the first device 5, hence opposite the engagement portion 5a. The tool 8 of the first device 5 is therefore also movable via rotation around the axis Y since it is stably carried by the arm 7 hinged to the frame 4. Even if movable via rotation around the axis Y, the tool 8 of the first device 5 is configured to be arranged at a distance D3 (FIGS. 9 and 10) from the ideal plane P greater than 40 mm, optionally comprised between 50 and 150 mm. In other words, even if movable close to and away from the ideal plane P, the tool 8 of the first device 5 is configured to always maintain a distance D3 from said ideal plane P and thus remain, with respect to said plane P, always on the same side on which said first guide 11 is present; in the same manner, the arm 7 of the first device 5 is configured to not intersect the ideal plane P.

The tool 8 of the first device 5 is arranged at a substantially fixed distance from the rotation axis Y of the arm 7 of the same first device 5; in other words, the distance between the first and the second end portion 7a, 7b of the arm 7 of the first device 5 is substantially fixed to thus define an arm 7 with fixed length. In order to be able to adjust the distance of the tool 8 from the wheel R, the tire changer apparatus 1 is configured to control the position of the drive unit 3, the angular position of the first device 5 with respect to the ideal plane P and the position of said first device 5 along the first guide 11. The angular position of the first device 5 can be defined, in case of arm 7 with rectilinear shape, such as the tilt between said arm and the ideal plane P; such tilt can also be defined (for example in the event that there is an arm 7 with curved shape or, more generally, non-rectilinear shape) such as the tilt between the ideal plane P and a virtual plane of the defined first device of the rotation axis Y of the arm 7 of the first device 5 and a geometric center of the tool 8 of the same first device 5: the first device 5 is configured to rotate with respect to the frame 4 in a manner such to maintain such tilt comprised between 10° and 45°, optionally comprised between 15° and 30°.

Figure 4:
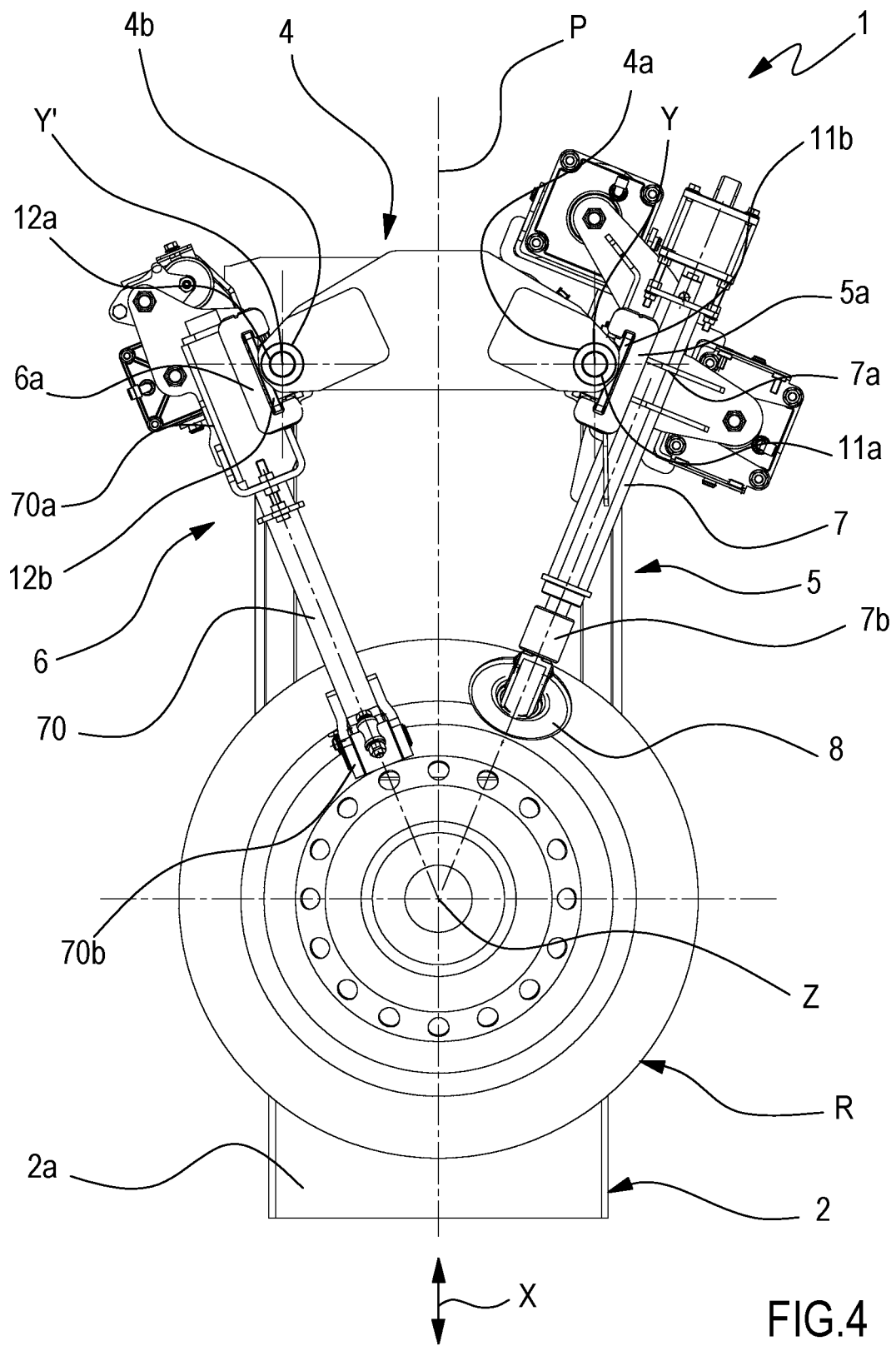
FIG. 4 is a top view of a tire changer apparatus in accordance with the present invention.
Figure 5:
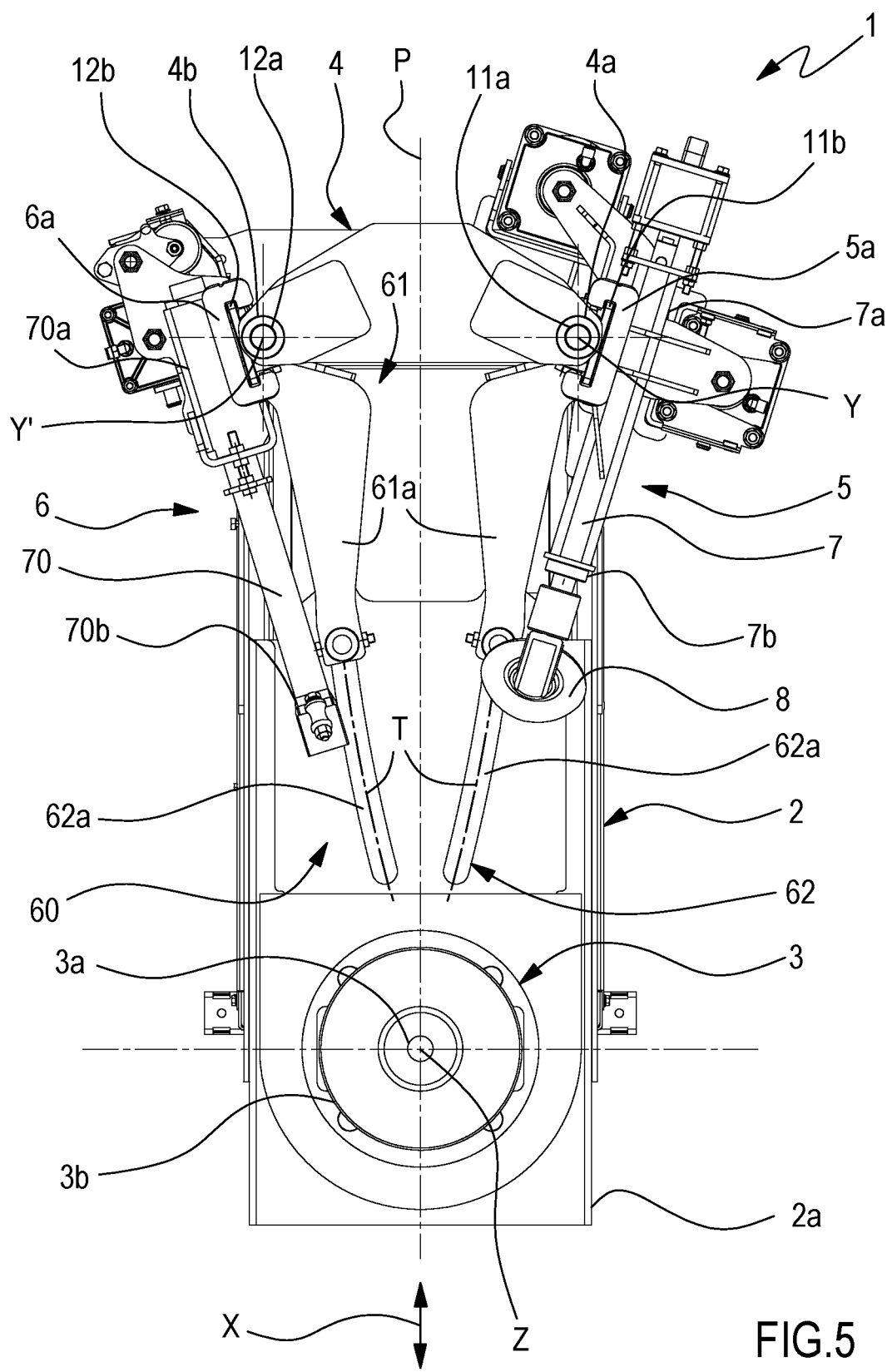
FIG. 5 is a further top view of a tire changer apparatus in accordance with the present invention, lacking wheel.

The second device 6 comprises a respective arm 70 hinged to the frame 4 and terminally carrying a respective tool 80. The arm 70 of the second device 6 is also configured to rotate around a respective axis Y' substantially parallel to the rotation axis Z of the wheel R. In particular, the arm 70 of the second device 6 is extended between a first and a second end portion 70a, 70b; at the first end portion 70a, the arm 70 defines the portion 6a of engagement of the second device 6 with the second guide 12 (FIGS. 1, 4 and 5). In detail, the engagement portion 6a defined by said first end portion of the arm 70 comprises a support, having substantially C-shaped section, engaged with the track 12b of the second guide 12. The support allows the arm 70 to slide along the track and to rotate together with the latter around the axis of the shaft 12a, coinciding therefore with the rotation axis Y' of the second device 6. The rotation axis Y' of the arm 70 of the second device 6 is arranged at a pre-established distance D2 (FIGS. 9 and 10) from the ideal plane P greater than 100 mm, optionally comprised between 150 and 250 mm. Such distance coincides with the distance present between the axis of the shaft 12a of the second guide 12 and the ideal plane P. In a non-limiting manner, the distance D1 present between the rotation axis Y of the arm of the first device 5 and the ideal plane P is substantially identical to the distance D2 present between the rotation axis Y' of the arm of the second device 6 and the ideal plane P.

In particular, as is visible in the enclosed figures, the first and second devices 5, 6 are configured to arrange the respective tools 8, 80 on opposite sides with respect to said ideal plane P. More in detail, the first and second devices 5, 6 are configured to arrange the rotation axes Y, Y' of the respective arms 7, 70 on opposite sides with respect to the ideal plane P as illustrated for example in FIGS. 9 and 10.

The arm 70 of the second device 6 can be extended, in a non-limiting manner, along a main extension direction that is substantially rectilinear; it may however be possible to make arms of different shape and size. In the event that the arm 70 of the second device 6 is extended along a rectilinear direction, it is also possible to define a tilt angle of said main extension direction with the ideal plane P to essentially define the tilt of the arm 70 with respect to said plane P. The second device 6 is in particular configured to rotate its arm 70 around its axis Y' such that the arm 70 can define, with the ideal plane P, an angle (FIGS. 9 and 10) comprised between 10° and 45°, optionally between 15° and 30°. In particular, as better described herein below, the second device 6, at least during a work condition in which said second device 6 is adapted to contact the tire, is configured to allow the rotation of the respective arm 70 so that the main extension direction of the latter substantially intersects the rotation axis Z of the wheel R (see for example FIGS. 9 and 10).

The second device 6 also comprises a respective tool 80 terminally carried by the arm 70 and configured to operate on a rim and/or a tire of a wheel R carried by the drive unit 3. In detail, said tool 80 is arranged at the second end portion 70b of the arm 70 of the second device 6, hence opposite the engagement portion 6a. The tool 80 of the second device 6 is therefore also movable via rotation around the axis Y' since it is integrally carried by the arm 70 of the same second device 6 hinged to the frame 4. Even if movable via rotation around the axis Y', the tool 80 carried by the arm 70 of the second device 6 is configured to be arranged at a distance D4 (FIGS. 9 and 10) from the ideal plane P greater than 40 mm, optionally comprised between 50 and 150 mm. In other words, even if movable close to and away from the ideal plane P, the tool 80 of the second device 6 is configured to always maintain a distance D4 from said ideal plane P and hence remain, with respect to said plane P, always on the same side on which said second guide 12 is present; in the same manner, the arm 70 of the second device 6 is configured to not intersect the ideal plane P.

The tool 80 of the second device 6 is arranged at a substantially fixed distance from the rotation axis Y' of the arm 70 of the same second device 6; in other words, the distance between the first and the second end portion 70a, 70b of the arm 70 of the second device 6 is substantially fixed to thus define an arm 70 with fixed length. Hence in order to be able to adjust the distance of the tool 80 of the second device 6 from the wheel R, the tire changer apparatus 1 is configured to control the position of the drive unit 3, the angular position of the second device 6 with respect to the ideal plane P and the position of said second device 6 along the second guide 12. The angular position of the second device 6 can be defined, in the case of arm 70 with rectilinear shape, such as the tilt between said arm and the ideal plane P; such tilt can also be defined (for example in the event that there is an arm 7 with curved shape or, more generally, non-rectilinear shape) such as the tilt present between the ideal plane and a defined virtual plane of the rotation axis Y' of the arm 70 of the second device 6 and a geometric center of the tool 80 of the same second device 6: the second device 6 is configured to rotate with respect to the frame 4 in a manner such to maintain such tilt comprised between 10° and 45°, optionally comprised between 15° and 30°.

In more detail, the first and second devices 5, 6, at least during a work condition in which both the tools 8, 80 of said first and second devices 5, 6 are adapted to contact the tire, can be configured to move the respective tools such that the distance present between the tool 8 of the first device 5 and the ideal plane P is substantially identical to the distance present between the tool 80 of the second device 6 and said ideal plane P. In other words, the first and second devices 5, 6, at least during a work condition in which both the tools 8, 80 of said first and second devices are adapted to contact the tire, can be configured to move the respective tools 8, 80 such that the angles of the virtual planes, respectively of the first and of the second device 5, 6, are substantially identical in relation to the ideal plane P.

The rotation of the first and second devices 5, 6 can be executed, in a first embodiment, electronically by means of the control unit 50 active in commanding at least one rotation actuator or executed, in a second embodiment, mechanically by means of an interconnection system.

In detail, in the first embodiment, the tire changer apparatus 1 comprises at least one rotation actuator active on said first and second devices 5, 6 and configured to allow the rotation of the arms 7, 70 of the latter around the respective axes Y, Y'. The control unit 50 is connected and active in commanding said rotation actuator and configured to manage the rotation of said devices. As described above, the tire changer apparatus 1 comprises a translation actuator 31 active on the drive unit 3 and configured to move the latter along the pre-established direction X close to and away from the frame 4, between a plurality of work positions; the control unit 50 active in commanding said translation actuator 31 and said rotation actuator can be configured to:

command the translation actuator 31 in order to move the drive unit 3 in a work position, and depending on the work position reached by the drive unit 3 and/or as a function of a representative signal of a characteristic of a wheel R, command the rotation actuator in order to rotate the arms 7, 70 of the first and second devices 5, 6 with respect to their axes Y, Y' such that the tools 8, 80 of the first and second devices 5, 6 can correctly operate on the rim and/or tire of the wheel R mounted on the drive unit 3.

In particular, the control unit 50 can be configured to command the rotation actuator in order to rotate the arms 7, 70 of the first and second devices 5, 6 and arrange the tool 8 of the first device 5 at a distance from the ideal plane P substantially identical to a distance present between the tool 80 of the second device 6 and said ideal plane P. In other words, by considering the identical distance between the rotation axes Y, Y' of the arms 7, 70 of the first and second devices from the ideal plane, the control unit 50 is configured to arrange the virtual planes of the first and of the second device at a same tilt with respect to the ideal plane P. In the event that the arms 7, 70 of the first and of the second device 5, 6 have a rectilinear extension, the control unit 50 can be configured to command the rotation actuator in order to rotate the arms 7, 70 of the first and second devices 5, 6 so as to arrange the main extension directions of said arms 7, 70 of said first and second devices 5, 6 substantially intersecting with the rotation axis Z of the wheel R as illustrated in the FIGS. 4, 9 and 10. In still more detail, the control unit 50 is configured to move the drive unit 3 along the pre-established direction X and consequently move the rotation axis Z of the wheel along the ideal plane P (such movement can for example be a function of the dimensions of the wheel mounted on the drive unit 3); the control unit 50 can be configured to command, as a function of said movement, the at least one rotation actuator as a function of the movement of the drive unit 3 in a manner such to rotate the first and second devices 5, 6 so that the tools 8, 80 can reach a correct position with respect to the tire in order to execute a procedure of assembly and/or disassembly of the tire on/from the rim. Nevertheless it may be possible to provide for a control unit 50 configured to command the rotation of the arms 7, 70 of the first and second devices 5, 6, independent of the movement of the drive unit 3; for example, the control unit 50 can be configured to receive in inlet a representative signal of a characteristic of the wheel R and as a function of this command the rotation of the arms 7, 70 of the first and second devices 5, 6. The characteristic of the wheel R can for example comprise at least one from among: a diameter of the rim, a width of the rim, a diameter of the tire, a width of the tire. Such characteristic can be acquired by the control unit, for example by means of one or more sensors connected to the control unit 50 and configured to emit said signal representative of the characteristic of the wheel. The control unit 50, connected to said sensors, can be configured to process said signal and estimate the characteristic of the wheel; following the executed estimation, the control unit 50 can be configured to command a pre-established rotation of the arms 7, 70 of the first and second devices 5, 6. Alternatively, the characteristic of the wheel R can be manually inserted by an assigned operator directly into the control unit.

The at least one actuator can comprise at least one first and second rotation actuators that are distinct and independent from each other, hence capable of operating independently from each other; the control unit 50 is configured to act by commanding said first and second rotation actuator in order to allow the independent rotation of the arms 7, 70 of the first and second devices 5, 6. In such configuration, the control unit 50 can be configured to:

receive, in inlet, at least one signal representative of a characteristic of a wheel R, as a function of said representative signal, command the translation actuator 31 to move the drive unit 3 into a pre-established work position, as a function of the work position reached by the drive unit 3 and/or on said representative signal of the characteristic of the wheel R, independently command the first and the second rotation actuator in order to rotate the arms 7, 70 of the first and second devices 5, 6 so as to arrange the respective tools 8, 80 in an operative position in which such tools 8 are adapted to operate on a rim and/or a tire of a wheel R carried by the drive unit 3, following the rotation of the arms 7, 70, command the at least one lifting actuator 21 to move at least one of said first and second devices 5, 6 along the respective guides 11, 12 (along a direction substantially parallel to the rotation axis Z of the wheel R) in order to bring at least one of the tools 8, 80 of said first and second devices 5, 6 in contact with the rim and/or the tire of the wheel R carried by the drive unit 3.

In fact, in the first embodiment, the control unit 50 is active on the translation actuator 31, on the first and second lifting actuators and on the first and second rotation actuators in order to synchronize (directly or indirectly) the rotation of the first and second devices 5, 6 with the movement of the drive unit 3 (whose movement can be a function of a characteristic of the wheel, e.g. the diameter of the wheel) so as to bring the tools 8, 80 of said first and second devices 5, 6 into a correct position for the execution of a procedure of assembly and/or disassembly of the tire from rim.

The movement of the first and second devices 5, 6 along the respective guides 11, 12 is managed by the control unit 50 depending on the distance of the wheel R from the base 2 and on the dimensions thereof, such as for example the width. The position and the width of the wheel R can for example be manually inserted in the control unit by an operator or they can be automatically detected by one or more sensors associable with at least one from among: the first device, the second device, the base 2, the drive unit 3, the frame 4.

In addition, in carrying out the control of the above-described steps, i.e. in controlling and coordinating the various above-described actuators, the control unit 50 cooperates with sensors comprising one or more from among encoders, position sensors, end stop sensors, angular position sensors, per se known and useful for providing position information of the various movable components to the unit.

In the second embodiment, the synchronization of the rotation of the first and second devices 5, 6 and the movement of the drive unit 3 can be managed by an interconnection system 60 of mechanical type, such as for example illustrated in FIGS. 5-8. In particular, such interconnection system 60 can be configured to connect in movement the first and second devices 5, 6 with the drive unit 3; the interconnection system 60 is configured to rotate the arms 7, 70 of the first and second devices 5, 6 during the movement of the drive unit 3 along the predetermined direction X lying on the ideal plane P. In detail, the interconnection system 60 can comprise:

at least one lever 61 stably constrained to the first and second devices 5, 6 and configured to rotate the arms 7, 70 of the latter around their axes Y, Y', at least one pusher 62 stably carried by the drive unit 3 and movable together with the latter along the predetermined direction X.

The lever 61 and the pusher 62 are engaged in motion with each other such that, following the movement of the drive unit 3 along the predetermined direction X, the pusher 62 can rotate the at least one lever 61 and consequently the arms 7, 70 of the first and second devices 5, 6 around the respective axes Y, Y'. At least one between the pusher 62 and the lever 61 comprises a shaped guiding portion extended along a pre-established trajectory T; the other between said lever 61 and said pusher 62 is constrained to the shaped guiding portion and configured to be moved, during the movement of the drive unit 3 along the predetermined direction X, along the trajectory T in order to allow the rotation of the lever 61 and consequently of the arms 7, 70 of the first and second devices 5, 6, around the respective axes Y, Y'.

Figure 6:
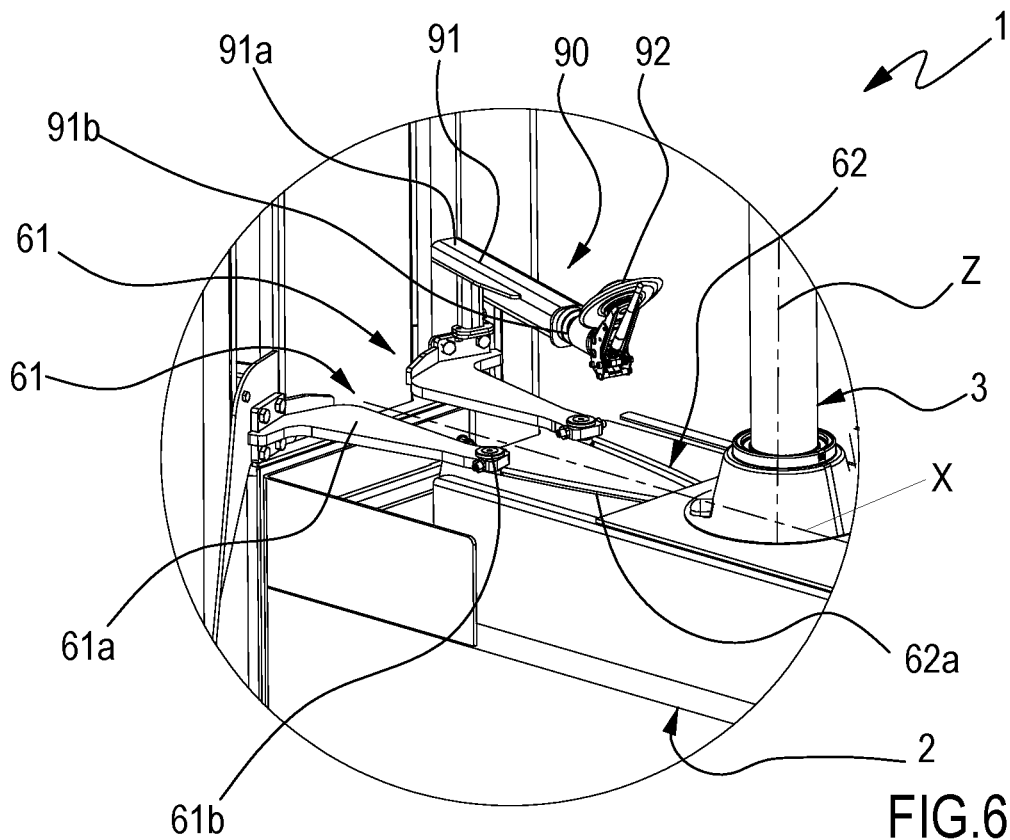
FIG. 6 is a detailed view of the apparatus of FIG. 5.

FIG. 6 for example illustrates a configuration of the interconnection system 60 in which the pusher 62 carried by the drive unit 3 comprises said shaped guiding portion having at least one groove 62a extended along the pre-established trajectory T; the lever 61 comprises at least one connection body 61a with stably elongated shape constrained to the first and second devices 5, 6: the lever 61 also comprises at least one projection 61b engaged via sliding within the groove 62a of the pusher 62. During the movement of the drive unit 3 along the predetermined direction X and consequently of the pusher 62, the projection 61b of the lever 61 is configured to slide within the groove 62a and guide in rotation said lever 61 with consequent rotation of the arms 7, 70 of the first and second devices 5, 6 around the respective axes Y, Y'.

In detail, in the example of FIG. 6, the groove 62a is illustrated which comprises, in a non-limiting manner, a first and a second groove extended along respective trajectories T lying on a plane orthogonal to the ideal plane P and orthogonal to the rotation axis Z of the wheel R; the first and second grooves are for example identical regarding shape and size and arranged symmetrically with respect to the ideal plane P. In turn, the lever 61 comprises a first connection body 61a stably constrained to the first device 5 by means of the track 11b of the first guide 11: the first connection body terminally carries the projection 61b comprising at least one pin engaged via sliding within the first groove. The lever 61 also comprises a second connection body 61a stably constrained to the second device 6 by means of the track 12b of the second guide 12: the second connection body terminally carries the projection 61b comprising at least one pin engaged via sliding within the second groove.

During the movement of the drive unit 3 along the pre-established direction X, the grooves 62a of the pusher 62 are moved with respect to the frame 4 and oblige the pins of the first and second levers to slide within said grooves and to follow the pre-established trajectory T suitably shaped in order to allow the simultaneous rotation of the first and second devices 5, 6 with respect to the ideal plane P.

Figure 8:
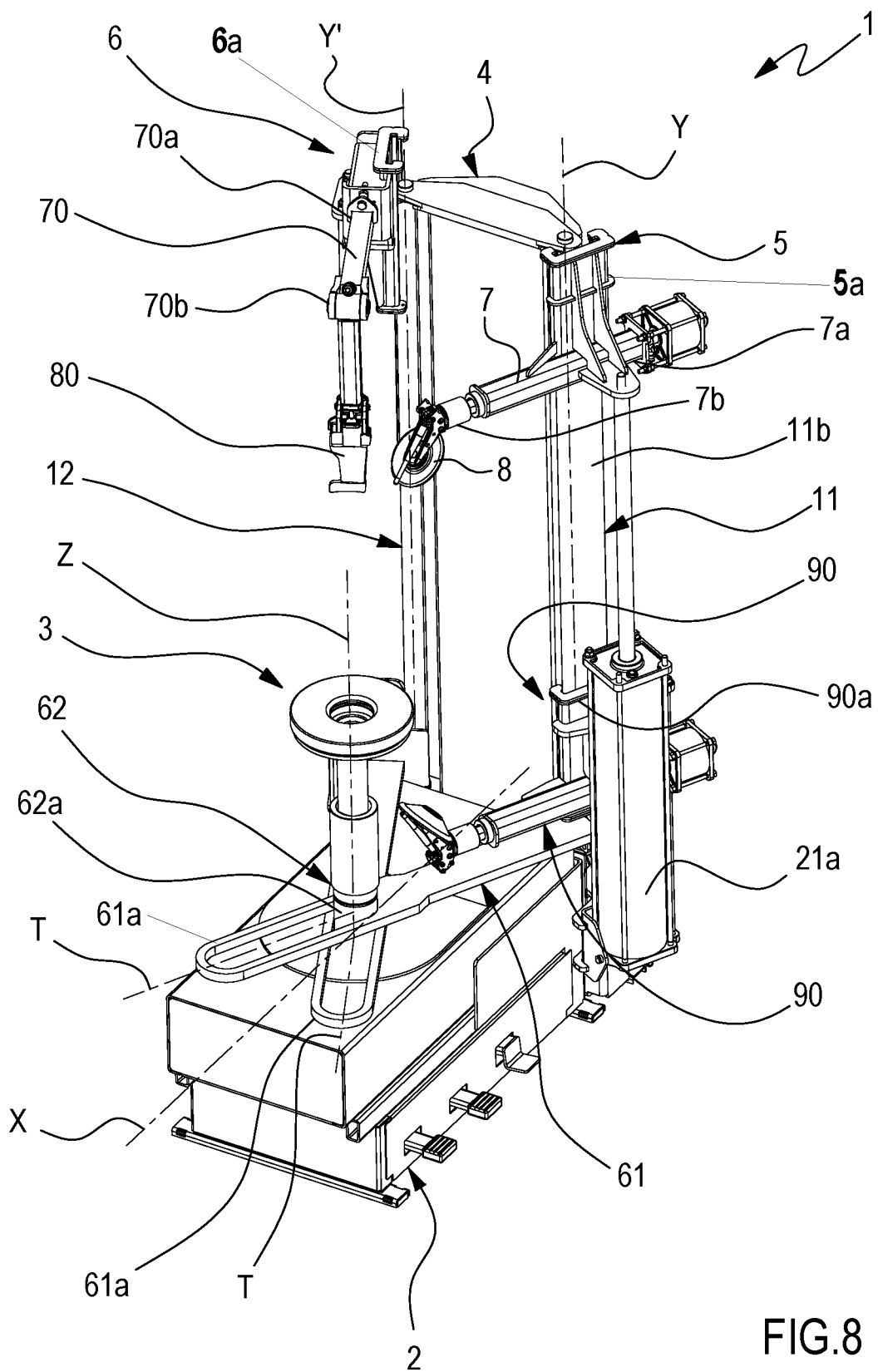
FIG. 8 is a further perspective view of a tire changer apparatus in accordance with the present invention.

FIG. 8 illustrates a different configuration of the interconnection system 60 in which the pusher 62 comprises a pin, while the lever 61 comprises at least one connection body 61a with stably elongated shape constrained to the first and second devices 5, 6; in such configuration, it is the connection body 61a of the lever 61 which terminally carries the shaped guiding portion extended along the pre-established trajectory T: during the movement of the drive unit 3 along the predetermined direction X and consequently of the pusher 62, the pin of the pusher 62 is configured to slide along the shaped guiding portion of the lever 61 and guide in rotation said lever 61 with consequent rotation of the arms 7, 70 of the first and second devices 5, 6 around the respective axes Y, Y'.

In the embodiment of FIG. 8, the pin of the pusher 62 is defined by the casing 3c of the drive unit 3 while the shaped guiding portion of the lever 61 comprises a slot within which the casing 3c is engaged. In detail, the at least one lever comprises a first and a second lever; the first lever comprises a connection body 61a which is constrained to the first device 5 by means of the track of the first guide 11: said connection body 61a comprises a slot engaged with the casing 3c of the drive unit 3. The second lever comprises a respective connection body 61a constrained to the second device 6 by means of the plate of the second guide 12: said connection body comprises a respective slot, it too engaged with the casing 3c of the drive unit 3. During the movement of the drive unit 3, and consequently of the casing 3c along the predetermined direction X, the casing 3c is configured to slide within the slots of the first and second levers in order to guide the latter in rotation and consequently carry in rotation the arms 7, 70 of the first and second devices 5, 6 around the respective axes Y, Y'.

In fact, the interconnection system 60 comprises at least one cam (or another mechanical device for transforming the motion) configured to transform the translational motion of the drive unit 3 into a rotational motion of the arms of the first and second devices 5, 6.

In detail, while in the movement managed by means of the control unit 50 (first embodiment described above) the rotation of the arms 7, 70 can occur in a manner that is entirely independent with respect to the movement of the drive unit 3 along the direction X, in the rotation of the arms 7, 70 managed mechanically the rotation of the latter is a function of the movement X of the drive unit 3.

Figure 9:
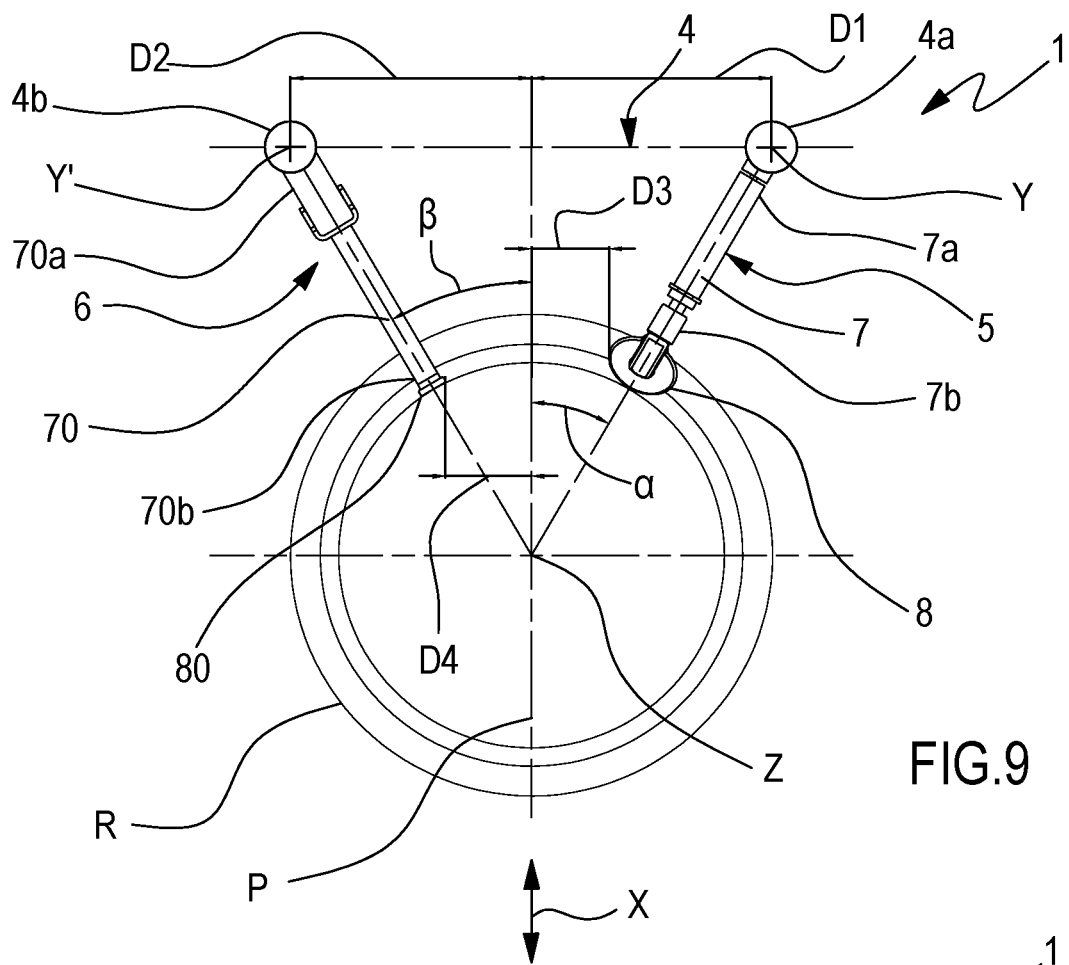
FIGS. 9-11 schematically show different operative conditions of a tire changer apparatus in accordance with the present invention.
Figure 10:
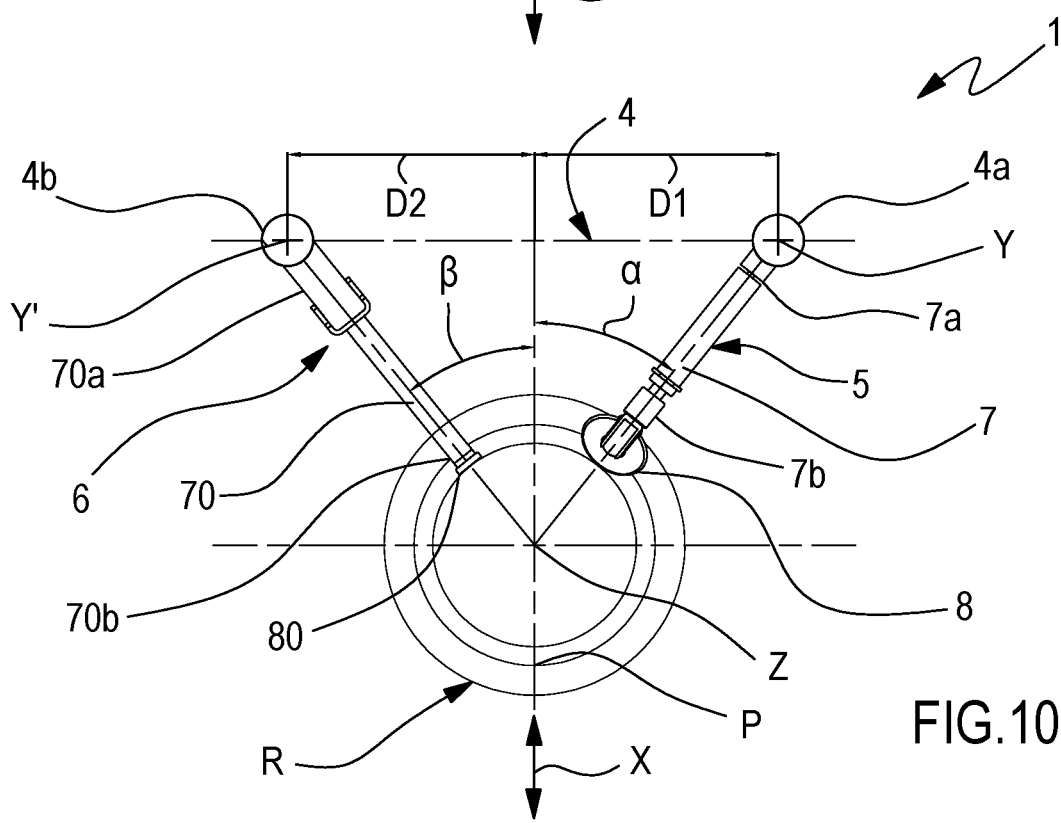
Figure 11:
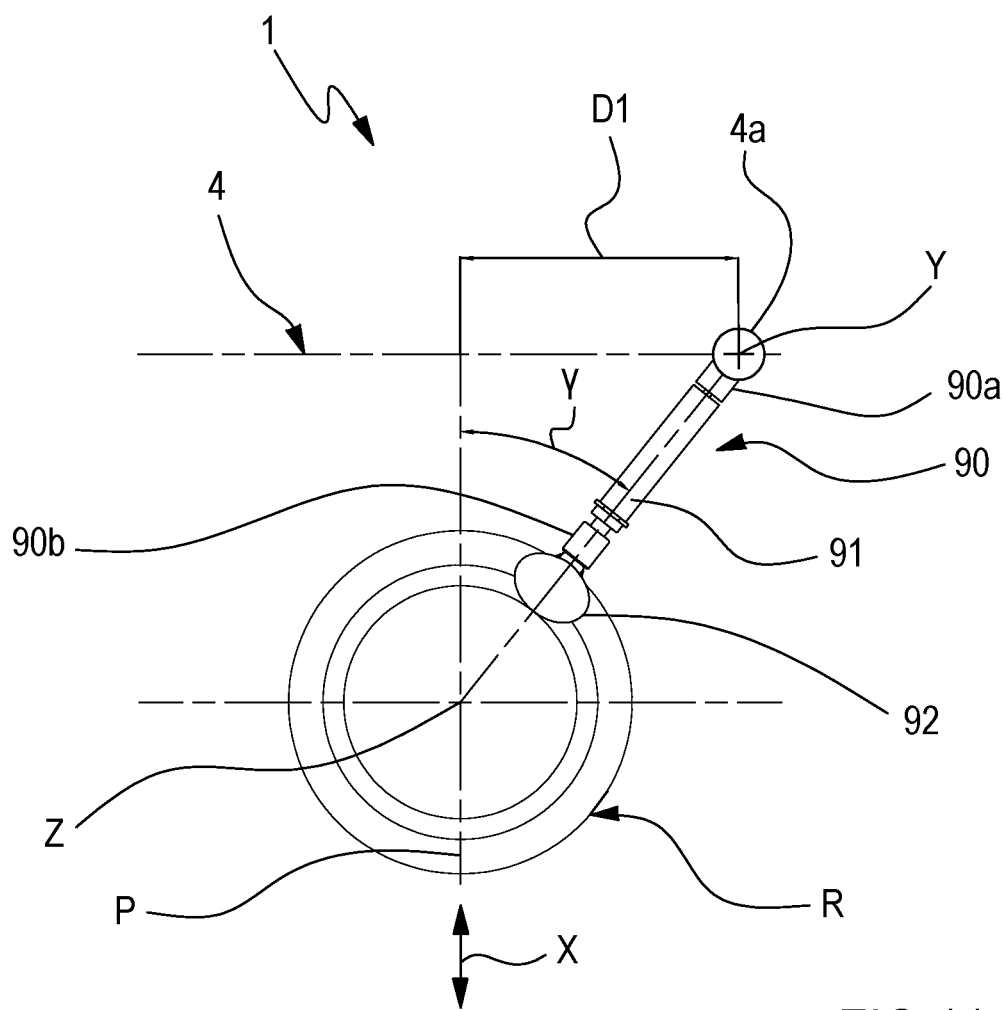

Schematically illustrated in FIGS. 9 and 10 is the movement of the drive unit 3 along the direction X, which can be caused by the assembly of a different wheel R on the drive unit 3 (case shown in FIGS. 9 and 10 in which the wheel R of FIG. 9 is larger than the wheel of FIG. 10); as can be seen in FIGS. 9 and 10, the distances D1 and D2 of the rotation axes Y, Y' of the first and second devices 5, 6 with respect to the ideal plane P remain unchanged during the rotation of the arms since they are hinged to the frame 4. During the movement of the drive unit 3, the first and second devices 5, 6 are configured to adapt the tilt of the arms as illustrated in FIGS. 9 and 10 in order to bring the tools 8, 80 into a position in which they execute a correct procedure of assembly and/or disassembly of a tire from a wheel.

The tools of the first and of the second device 5, 6 can be equal to each other or have a different structure and function. Illustrated in the enclosed figures, in a non-limiting manner, is a tool of the first device 5 comprising a pressing element configured to act thrustingly on the first bead of the tire in order to allow at least one partial detachment of said first bead from the first perimeter edge of the rim. The pressing element comprises a rotary body configured to define, with the tire, a friction of rolling type; the rotary body is configured to rotate around an axis thereof, in an operative condition in which the wheel R rotates around the rotation axis Z and the rotary body contacts the tire. The rotary body comprises at least one selected from among: a disc, a cylinder, a ball. The tool 80 of the second device 6 can thus comprise a pressing element similar to that of the first device 5 or it can comprise, as illustrated in the enclosed figures, an inserter-extractor element configured to be radially interposed between the first perimeter edge of the rim and the first bead of the tire in order to allow the engagement-disengagement of said first bead with the first perimeter edge of the rim.

In the enclosed figures, a tire changer apparatus 1 has been illustrated comprising, in a non-limiting manner, a third device 90 (FIGS. 1A, 6-8) also having an arm 91 hinged to the frame 4 and configured to rotate around an axis Y substantially parallel to the rotation axis Z. In particular, the arm 91 of the third device 90 is extended between a first and a second end portion 91a, 91b; at the first end portion 91a, the arm 91 defines a portion 90a of engagement of the third device 90 with the first guide 11. In detail, the engagement portion 90a defined by said first end portion of the arm 91 comprises a support, having substantially C-shaped section, engaged with the track 11b of the first guide 11. The support allows the arm 7 to slide along the track and to rotate together with the latter around the axis of the shaft 11a, hence coinciding with the rotation axis Y of the first and third devices 5, 90. In fact, the rotation axis Y of the third device coincides with the rotation axis Y of the first device 5; both the devices 5, 90 are constrained to the track 11a of the first guide 11 by means of an identical support system having C shape. Therefore, also the rotation axis Y of the arm 91 of the third device 90 is arranged at a pre-established distance D1 (FIG. 11) from the ideal plane P greater than 100 mm, optionally comprised between 150 and 250 mm. Such distance coincides with the distance present between the axis of the shaft 11a of the first guide 11 and the ideal plane P. The third device 90 is thus configured to arrange the rotation axis Y of its arm 91 on an opposite side with respect to the rotation axis Y' of the arm 70 of the second device 6 with respect to said ideal plane P.

As is visible in the enclosed figures, the arm 91 of the third device 90 can be extended, in a non-limiting manner, along a main extension direction that is substantially rectilinear; nevertheless, it may be possible to make arms of different shape and size. In the event that the arm 91 is extended along a rectilinear direction, it is also possible to define a tilt angle of said main extension direction with the ideal plane P to essentially define the tilt of the arm 91 with respect to said plane P. The third device 90 is in particular configured to rotate the arm 91 around its axis Y such that said arm 91 can define, with the ideal plane P, an angle comprised between 10° and 45°, optionally between 15° and 30°. In particular, as better described herein below, the third device 90, at least during a work condition in which said third device 91 is adapted to contact the tire, is configured to allow the rotation of the respective arm 91 so that the main extension direction of the latter substantially intersects the rotation axis Z of the wheel R (see for example FIG. 11).

The third device 90 also comprises a respective tool 92 terminally carried by the arm 91 of the third device and configured to operate on a rim and/or a tire of a wheel R carried by the drive unit 3. In detail, said tool 92 is arranged at the second end portion of the arm 91 of the third device 90, hence opposite the engagement portion 90a. The tool 92 of the third device 90 is therefore also movable via rotation around the axis Y, since it is integrally carried by the arm 91 hinged to the frame 4. Even if movable via rotation around the axis Y, the tool 92 carried by the arm 91 of the third device 90 is configured to be arranged at a distance from the ideal plane P greater than 40 mm, optionally comprised between 50 and 150 mm. In other words, even if movable close to and away from the ideal plane P, the tool 92 of the third device 90 is configured to always maintain a pre-established distance from said ideal plane P and thus remain, with respect to said plane P, always on the same side on which said first guide 11 is present; in the same manner, the arm 91 of the third device 90 is configured to not intersect the ideal plane P.

The tool 92 of the third device 90 is arranged at a substantially fixed distance from the rotation axis Y of the arm 91 of the same third device 90; in other words, the distance between the first and the second end portion 91*a*, 91*b* of the arm 91 of the third device 5 is substantially fixed to thus define an arm 91 with fixed length. Hence, in order to be able to adjust distance of the tool 90 from the wheel, the tire changer apparatus 1 is configured to control the position of the drive unit 3, the angular position of the third device 90 with respect to the ideal plane P and the position of said third device 90 along the first guide 11. The angular position of the third device 90 can be defined, in the case of arm 91 with rectilinear shape, as the tilt between said arm and the ideal plane P; such tilt can also be defined (for example in the event that there is an arm 91 with curved shape or, more generally, non-rectilinear shape) as the tilt present between the ideal plane and a defined virtual plane of the rotation axis Y of the arm 91 of the third device 90 and a geometric center of the tool 92 of the same third device 90: the third device 90 is configured to rotate with respect to the frame 4 in a manner such to maintain such tilt comprised between 10° and 45°, optionally comprised between 15° and 30°.

The first and third devices 5, 90, since they are hinged to the same first guide 11, are configured to integrally rotate with respect to the frame 4 and in particular to define, with respect to the ideal plane, substantially a same tilt. Indeed, the first and the third device 5, 90, at least during a work condition in which both the tools of said first and third devices are adapted to contact the tire, are configured to move the respective tools such that the angles of the virtual planes, respectively of the first and of the third device, are substantially identical in relation to the ideal plane P. In other words, the first and the third device 5, 90, at least during a work condition in which both the tools of said first and third devices are adapted to contact the tire, are configured to move the respective tools such that the distance present between the tool 8 of the first device 5 and the ideal plane P is substantially identical to the distance present between the tool 92 of the third device 90 and said ideal plane P.

However, even if engaged with the same track 11*b*, the first and third devices 5, 90 are separated from each other and independent in the translational movement along said first guide 11. Indeed, the third device 90 is spaced from the first device 5 along said first guide 11: the first device 5 is placed at a distance from the base 2 greater than a distance between said base and the third device 90. The axial movement of the third device 90 is generated by at least one third lifting actuator 21*c* that is distinct and independent of the first and second lifting actuators 21*a*, 21*b*. in particular, the third lifting actuator 21*c* is configured to move the third device 90 along the first guide 11 of the frame 4 close to and away from the base 2.

The control unit 50 is connected to and active in commanding the third lifting actuator 21*c* and configured to command, in an independent manner, said lifting actuators 21*a*, 21*b*, 21*c* such that the first, second and third devices 5, 6, 90 can slide along the guides in an independent manner.

The tool 92 of the third device 90 can comprise a pressing element similar to that of the first device 5 or it can comprise an inserter-extractor element similar to that of the second device 6.

Illustrated in the enclosed figures, in a non-limiting manner, is a tool 92 of the third device 90 comprising a pressing element, similar to the pressing element of the first device 5, configured to act thrustingly on the second bead of the tire in order to allow at least one partial detachment of said second bead from the second perimeter edge of the rim. The pressing element of the third device 90 can nevertheless also be employed in order to be radially interposed between a perimeter edge of the rim and a bead of the tire.

Disassembly Process

Also forming the object of the present invention is a process of disassembly of a tire from a rim by means of the tire changer apparatus in accordance with the above-reported description and/or in accordance with the enclosed claims.

The disassembly process initially provides for a step of positioning the wheel on the drive unit 3. Then, the process provides for the movement of the drive unit 3 along the predetermined direction X lying on the ideal plane P; the movement of the drive unit is a function of a characteristic of the wheel, for example the diameter of the rim and/or the external diameter of the tire. The process also provides for a step of detecting the position of the wheel with respect to the base 2 and/or with respect to the frame; in particular, the process provides for a step of determining the width of the rim and the position of the first and second perimeter edges of the rim. In this manner, it is possible to estimate the position of the first and second beads of the tire on which the tools of the tire changer apparatus 1 act. The determination of the width and of the position of the first and second perimeter edges of the rim can be automatically executed by means of the aid of one or more sensors connected to the control unit 50 and/or can be carried out by means of use of data inserted manually by an assigned operator.

Before or after the movement of the drive unit, the process provides for deflating the tire, such that the same can be detached from the rim and subsequently removed.

Depending on the position of the drive unit 3 and/or as a function of a characteristic of the wheel R, the process provides for the rotation of the arms of the first and second devices 5, 6—and if present of the third device—such that the respective tools can operate on the rim and/or tire of the wheel R carried by the drive unit 3. The step of rotation of the arms of the first and second devices 5, 6—and if present of the third device 90—is carried out simultaneously with or after the movement of the drive unit 3 along the predetermined direction X, such that the main extension direction of the arms, at least during the rotation of the wheel around the rotation axis Z, substantially intersects said rotation axis Z.

Following the rotation of the arms 7, 70, the wheel R is rotated around its axis Z; then, the tool 8 of the first device 5 is pressed on the first bead of the tire, such that the tool 8 can generate a detachment of the first bead from the first perimeter edge of the rim. If the third device is present, the process also provides for, preferably simultaneously with the step of pressing the first bead, a step of pressing the second bead by means of the tool 92 of the third device 90, in a manner such to generate a detachment of the second bead from the second perimeter edge of the rim.

Following the detachment of the first bead from the first edge of the rim, the process provides for interrupting the rotation of the wheel by means of the locking of the drive unit 3 and the subsequent radial interposition of the tool 80 of the second device 6 between said first bead and the first perimeter edge of the rim; the radial interposition of the tool 80 of the second device 6, between said first bead and the edge of the rim, provides for the movement of the second device 6 along said second guide 12 close to the wheel R.

During the radial interposition of the tool 80 of the second device 6 between said first bead and the edge of the rim, the process can provide for the movement of the wheel, by means of the drive unit 3, along said pre-established direction X lying on the ideal plane P, in order to allow said tool 80 of the second device 6 to extract at least part of the first bead from the first perimeter edge of the rim. Alternatively, the extraction of the bead can be executed due to the use of a shaped tool 80 which allows extracting the bead by means of only the movement, away from the wheel, of the tool 80 and simultaneously maintain the position of the drive unit 3 fixed with respect to the frame 4.

Following the partial extraction of the first bead from the first perimeter edge of the rim and during the radial interposition of the tool 80 of the second device 6 between said first bead and the first perimeter edge of the rim, the process provides for the rotation of the wheel R around the axis Z so as to completely disengage the first bead from the first perimeter edge of the rim. During the radial interposition of the tool 80 of the second device 6 between said first bead and the edge of the rim, the first device 5 is moved away from the wheel by means of the movement of the same along the first guide 11 of the frame 4, optionally away from the base 2.

Following the complete disengagement of the first bead from the first perimeter edge of the rim, the process comprises the following steps:

stopping the rotation of the wheel R around its rotation axis Z, at least partly placing the second bead of the tire in contact with the first perimeter edge of the rim, following the contact of the second bead of the tire with the first perimeter edge of the rim, radially interposing the tool 80, 92 of the second and/or third device 6, 90 between said second bead and the first perimeter edge of the rim in order to allow said tool to extract at least part of the second bead from the first perimeter edge of the rim, following the partial extraction of the second bead from the first perimeter edge of the rim and during the radial interposition of the tool of the first and/or third device between said second bead and the first perimeter edge of the rim, rotating the wheel R around the rotation axis Z so as to completely disengage the tire from the rim.

Assembly Process

Also forming the object of the present invention is a process of assembly of a tire on a rim by means of the tire changer apparatus 1 in accordance with the above-reported description and/or in accordance with the enclosed claims.

The assembly process initially provides for a step of assembly of the rim of the wheel R on the drive unit 3. Then, the process possibly provides for the movement of the drive unit 3 along the predetermined direction X lying on the ideal plane P; the movement of the drive unit 3 is a function of a characteristic of the wheel, for example of the diameter of the rim and/or of the external diameter of the tire to be assembled on the rim.

Depending on the position of the drive unit 3 and/or depending on a characteristic of the wheel R, the process possibly provides for the rotation of the arms 7, 70 of the first and second devices 5, 6—and if present of the third device 90—such that the respective tools can operate on the rim and/or tire of the wheel R carried by the drive unit 3. The step of rotation of the arms 7, 70 of the first and second devices 5, 6—and if present of the third device 90—is carried out simultaneously with or after the movement of the drive unit 3 along the predetermined direction X, such that the main extension direction of the arms, at least during the rotation of the wheel around the rotation axis Z, substantially intersects said rotation axis Z.

Following the correct positioning of the rim along the ideal plane P and the correct positioning (rotation) of the tools of the first, second and optionally third devices, the process provides for positioning the tire on the rim mounted on the drive unit 3; the tire is in particular abutted against the rim such that the second bead of the tire is abutted against the first perimeter edge of the rim. Then, the process provides for the radial interposition of the tool of the first or third device between the second bead of the tire and the first perimeter edge of the rim. Subsequently, a movement can be executed, in a non-limiting manner, of the drive unit 3 along the predetermined direction X lying on the ideal plane P so that said tool can allow the engagement of a part of the second bead with the first perimeter edge of the rim. Alternatively, the engagement of the bead can be carried out due to the use of a shaped tool which allows inserting at least part of the first bead by means of the movement, close to the wheel, of the tool and simultaneously maintaining the position of the drive unit 3 fixed with respect to the frame 4.

Following the partial engagement of the second bead with the first perimeter edge of the rim and during the radial interposition of the tool between said second bead and the first perimeter edge of the rim, the process provides for the rotation of the wheel R around the axis Z so as to completely engage the second bead with the first perimeter edge of the rim: following the complete engagement of the second bead with the first perimeter edge of the rim, the second bead results interposed between the first and second perimeter edges of the rim.

Then, the second bead is arranged at the second perimeter edge of the rim and the first bead is placed at the first perimeter edge of the rim. Subsequently, the process provides for executing a pressing on the first bead of the tire, by means of the tool 8, 80 of the first and/or second device 5, 6: in such step, said tools are made to slide along the respective guide, moving close towards the second bead of the tire up to the partial engagement of the first bead with the first perimeter edge of the rim.

Following the partial engagement of the first bead with the first perimeter edge of the rim and during the action of pressing the tool of the first and/or second device on the first bead, the process provides for rotating the wheel R around the axis Z so as to completely engage the first bead to the first perimeter edge of the rim: following the complete engagement of the first bead with the first perimeter edge of the rim, the first and second beads both result interposed between the first and second perimeter edges of the rim.

It is then possible to move the tools of the first and second devices—and if present of the third device—away from the wheel by means of axial sliding along the respective guides 11 and 12 away from the wheel. It is then possible to disengage the wheel R from the drive unit 3 and inflate the tire. The step of inflation of the wheel can at any rate be executed immediately after the insertion of the tire in the seat of the rim and hence before the disengagement of the wheel from the drive unit 3.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A tire changer apparatus for the assembly or disassembly of tires from a rim of a wheel of a vehicle, said tire changer apparatus comprising:
    a base;
    a drive unit coupled to the base and configured to receive and rotate around a rotation axis at least one wheel of a vehicle;
    a frame emerging from the base, wherein the drive unit is movable with respect to the base, along a predetermined direction transverse to the rotation axis, close to and away from the frame;
    a first device and a second device each of which comprises:
        at least one arm hinged to the frame and configured to rotate around a respective axis substantially parallel to the rotation axis of the wheel; and
        at least one tool terminally carried by the at least one arm and configured to operate on a rim or a tire of a wheel carried by the drive unit;
    one or more translation actuators active on the drive unit and configured to move the drive unit along the predetermined direction close to and away from the frame, between a plurality of work positions; and
    one or more interconnection systems configured to connect in movement the first and second devices with the drive unit, at least one of the interconnection systems being configured to rotate the arms of the first device and of the second device during the movement of the drive unit along the predetermined direction.

2. The tire changer apparatus of claim 1, wherein the rotation axis of the wheel and the predetermined direction define an ideal plane of movement of the drive unit, wherein the first and second devices are configured to arrange the respective tools on opposite sides with respect to said ideal plane.

3. The tire changer apparatus of claim 2, wherein the first and second devices, at least during a work condition in which at least one of the tools of both of said first device and second device are adapted to contact the tire, are configured to move the respective tools such that a distance present between the tool of the first device and the ideal plane results substantially identical to a distance present between the tool of the second device and said ideal plane.

4. The tire changer apparatus of claim 1, wherein the rotation axis of the wheel and the predetermined direction define an ideal plane of movement of the drive unit, the first and second devices being configured to arrange the rotation axes of the respective arms on opposite sides with respect to said ideal plane.

5. The tire changer apparatus of claim 4, wherein the rotation axis of the arm of the first device is arranged at a distance from the ideal plane substantially identical to a distance present between the rotation axis of the arm of the second device and the same ideal plane.

6. The tire changer apparatus of claim 1, wherein the tool of the first device is arranged at a fixed distance from the rotation axis of the arm of the same first device, and wherein the tool of the second device is arranged at a fixed distance from the rotation axis of the arm of the same second device.

7. The tire changer apparatus of claim 4, wherein the rotation axis of the arm of the first device and a geometric center of the tool of the same first device define a virtual plane that is tilted with respect to the ideal plane by an angle comprised between 10° and 45°, and
    wherein the rotation axis of the arm of the second device and a geometric center of the tool of the same second device define a virtual plane that is tilted with respect to the ideal plane by an angle comprised between 10° and 45°.

8. The tire changer apparatus of claim 1, wherein the first device is movable with respect to the frame along a direction substantially parallel to the rotation axis of the wheel,
    wherein the frame comprises a first guide extended parallel to the rotation axis of the wheel,
    wherein the first device comprises at least one engagement portion constrained to said first guide and also configured to allow the translation of the first device along said first guide, and
    wherein said first guide comprises:
        a shaft constrained to at least one first hinge of the frame and extended along an axis coinciding with the rotation axis of the arm of the first device; and
        at least one flat track stably constrained to the shaft and extended parallel to the latter, wherein the track is configured to directly engage the engagement portion of the first device and allow the latter to slide along a direction parallel to the rotation axis of the arm of the first device.

9. The tire changer apparatus of claim 1, wherein the second device is movable with respect to the frame along a direction substantially parallel to the rotation axis of the wheel,
    wherein the frame comprises a second guide extended parallel to the rotation axis of the wheel,
    wherein the second device comprises at least one engagement portion constrained to said second guide and configured to allow the translation of the second device along said second guide, and
    wherein said second guide comprises:
        a shaft constrained to at least one second hinge of the frame and extended along an axis coinciding with the rotation axis of the arm of the second device; and
        at least one flat track stably constrained to the shaft of the second device and extended parallel to the latter, said track being configured to directly engage the engagement portion of the second device and allow the latter to slide along a direction parallel to the rotation axis of the arm of the second device.

10. The tire changer apparatus of claim 1, wherein a preponderant part of the arm of the first device is extended along a main extension direction that is substantially rectilinear,
    wherein the first device, at least during a work condition in which the tool of said first device is adapted to contact the tire, is configured to allow the rotation of the respective arm so that the main extension direction of the latter substantially intersects the rotation axis of the wheel,
    wherein a preponderant part of the arm of the second device is extended along a main extension direction that is substantially rectilinear, and
    wherein the second device, at least during a work condition in which the tool of said second device is adapted to contact the tire, is configured to allow the rotation of the respective arm so that the main extension direction of the latter substantially intersects the rotation axis of the wheel.

11. The tire changer apparatus of claim 1, wherein at least one of the interconnection systems comprises:
- one or more levers stably constrained to the first and second devices and configured to rotate the arms of the latter around their axes; and
- one or more pushers stably carried by the drive unit and movable together with the latter along the predetermined direction, and
- wherein at least one of the levers and at least one of the pushers are engaged in motion with each other such that, following the movement of the drive unit along the predetermined direction, the at least one pusher is configurable to rotate the at least one lever and consequently the arms of the first and second devices around the respective axes.

12. The tire changer apparatus of claim 11, wherein at least one from between said at least one pusher and at least one lever comprises a shaped guiding portion extended along a pre-established trajectory, and
- wherein the other from between said at least one lever and at least one pusher is constrained to the shaped guiding portion and configured to be moved, during the movement of the drive unit along the predetermined direction, along said trajectory in order to allow the rotation of the at least one lever and consequently of the arms of the first and second devices around the respective axes.

13. The tire changer apparatus of claim 12, wherein:
- the at least one pusher comprises said shaped guiding portion having at least one groove extended along the pre-established trajectory,
- the at least one lever comprises at least one connection body with stably elongated shape constrained to the first or second device, wherein the at least one lever also comprises at least one projection engaged via sliding within the at least one groove of the at least one pusher, and
- wherein, during the movement of the drive unit along the predetermined direction and consequently of the pusher, the at least one projection of the at least one lever is configured to slide within the at least one groove and guide in rotation said at least one lever with consequent rotation of the arms of the first and second devices around the respective axes.

14. The tire changer apparatus of claim 1, further comprising at least one control unit active in commanding at least one of said translation actuators configured to command the at least one translation actuator, in order to move the drive unit into a work position in which the tools of the first and second devices are configured to operate on the rim or tire of a wheel mounted on the drive unit positions.

15. The tire changer apparatus of claim 14, wherein the control unit is configured to:
- receive, in inlet, at least one representative signal of a characteristic of a wheel, and to, as a function of said representative signal,
- command at least one of the translation actuators to move the drive unit in a pre-established work position.

16. A tire changer apparatus for the assembly or disassembly of tires from a rim of a wheel of a vehicle, said tire changer apparatus comprising:
- a base;
- a drive unit coupled to the base and configured to receive and rotate around a rotation axis at least one wheel of a vehicle;
- a frame emerging from the base, wherein the drive unit is movable with respect to the base, along a predetermined direction transverse to the rotation axis, close to and away from the frame, wherein the rotation axis of the wheel and the predetermined direction define an ideal plane of movement of the drive unit; and
- a first device and a second device each of which comprises:
  - at least one arm hinged to the frame and configured to rotate around a respective axis substantially parallel to the rotation axis of the wheel; and
  - at least one tool terminally carried by the at least one arm and configured to operate on a rim or a tire of a wheel carried by the drive unit,
- wherein the first and second devices are configured to arrange the respective tools on opposite sides with respect to said ideal plane,
- wherein a preponderant part of the arm of the first device is extended along a main extension direction that is substantially rectilinear, wherein the first device, at least during a work condition in which the tool of said first device is adapted to contact the tire, is configured to allow the rotation of the respective arm so that the main extension direction of the latter substantially intersects the rotation axis of the wheel, and
- wherein a preponderant part of the arm of the second device is extended along a main extension direction that is substantially rectilinear, wherein the second device, at least during a work condition in which the tool of said second device is adapted to contact the tire, is configured to allow the rotation of the respective arm so that the main extension direction of the latter substantially intersects the rotation axis of the wheel.

17. The tire changer apparatus of claim 16 comprising:
- one or more translation actuators active on the drive unit and configured to move the drive unit along the predetermined direction close to and away from the frame, between a plurality of work positions; and
- one or more interconnection systems configured to connect in movement the first and second devices with the drive unit, at least one of the interconnection systems being configured to rotate the arms of the first and of the second device during the movement of the drive unit along the predetermined direction,
- wherein the at least one interconnection system comprises:
  - one or more levers stably constrained to the first and second devices and configured to rotate the arms of the latter around their axes; and
  - one or more pushers stably carried by the drive unit and movable together with the latter along the predetermined direction, and
- wherein at least one the levers and at least one of the pushers are engaged in motion with each other such that, following the movement of the drive unit along the predetermined direction, the at least one pusher in configurable to rotate the at least one lever and consequently the arms of the first and second devices around the respective axes.

18. The tire changer apparatus of claim 17, wherein
the at least one pusher comprises said shaped guiding portion having at least one groove extended along a pre-established trajectory,
the at least one lever comprises at least one connection body with elongated shape, stably constrained to the first and/or second device, the at least one lever also comprising at least one projection engaged via sliding within the at least one groove of the at least one pusher, and wherein, during the movement of the drive unit along the predetermined direction and consequently of the pusher, at least one the projections of the at least one lever is configured to slide within the at least one groove and guide in rotation said at least one lever with consequent rotation of the arms of the first and second devices around the respective axes.

19. The tire changer apparatus of claim 18, wherein the rotation axis of the wheel and the predetermined direction define an ideal plane of movement of the drive unit,
wherein the at least one groove comprises a first groove and a second groove, the first and the second groove extending along respective trajectories lying on a plane orthogonal to the rotation axis of the wheel and orthogonal to the ideal plane, wherein the first and the second groove are arranged symmetrically with respect to each other with respect to the ideal plane, and
wherein at least one of the levers comprises a first connection body stably constrained to the first device, the first connection body terminally carrying a projection comprising at least one pin engaged via sliding within the first groove, the lever comprising a second connection body stably constrained to the second device, the second connection body terminally carrying a projection comprising at least one pin engaged via sliding within the second groove.

* * * * *